United States Patent
Neustein

(10) Patent No.: US 11,908,434 B2
(45) Date of Patent: *Feb. 20, 2024

(54) IMAGE CORRECTION DUE TO DEFORMATION OF COMPONENTS OF A VIEWING DEVICE

(71) Applicant: Magic Leap, Inc., Plantation, FL (US)

(72) Inventor: Adam Neustein, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/501,348

(22) Filed: Oct. 14, 2021

(65) Prior Publication Data

US 2022/0068245 A1 Mar. 3, 2022

Related U.S. Application Data

(63) Continuation of application No. 16/928,313, filed on Jul. 14, 2020, now Pat. No. 11,189,252, which is a
(Continued)

(51) Int. Cl.
*G09G 5/38* (2006.01)
*G09G 5/373* (2006.01)
(Continued)

(52) U.S. Cl.
CPC ............ *G09G 5/38* (2013.01); *G02B 27/0179* (2013.01); *G06T 7/73* (2017.01); *G09G 5/02* (2013.01);
(Continued)

(58) Field of Classification Search
CPC ............ G09G 5/38; G09G 5/02; G09G 5/373; G09G 2340/045; G09G 2340/0464;
(Continued)

(56) References Cited

U.S. PATENT DOCUMENTS

| | | |
|---|---|---|
| 4,344,092 A | 8/1982 | Miller |
| 4,652,930 A | 3/1987 | Crawford |

(Continued)

FOREIGN PATENT DOCUMENTS

| | | |
|---|---|---|
| CN | 100416340 C | 9/2008 |
| CN | 101449270 A | 6/2009 |

(Continued)

OTHER PUBLICATIONS

"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
(Continued)

*Primary Examiner* — Jin Ge
(74) *Attorney, Agent, or Firm* — Stephen M. De Klerk

(57) ABSTRACT

A display assembly displays a virtual object in a select location wherein an eye viewing the virtual object has an expected gaze direction. Deformation of the display assembly is detected. The deformation causes the virtual object to be viewable in an altered location wherein the eye has altered gaze direction. The virtual object may be displayed in a corrected location wherein the eye viewing the virtual object in the correct location has a corrected gaze direction that is moved closer to the expected gaze direction than the altered gaze direction.

14 Claims, 13 Drawing Sheets

Related U.S. Application Data continuation of application No. 16/355,611, filed on Mar. 15, 2019, now Pat. No. 10,755,676.

(60) Provisional application No. 62/643,672, filed on Mar. 15, 2018.

(51) Int. Cl.
  *G09G 5/02* (2006.01)
  *G06T 7/73* (2017.01)
  *G02B 27/01* (2006.01)

(52) U.S. Cl.
  CPC ..... *G09G 5/373* (2013.01); *G02B 2027/0187* (2013.01); *G06T 2207/30201* (2013.01); *G09G 2340/045* (2013.01); *G09G 2340/0464* (2013.01); *G09G 2354/00* (2013.01)

(58) Field of Classification Search
  CPC .............. G09G 2354/00; G06T 7/73; G06T 2207/30201; G02B 27/0179; G02B 2027/0187
  USPC ....................................................... 345/589
  See application file for complete search history.

(56) References Cited

U.S. PATENT DOCUMENTS

| | | |
|---|---|---|
| 4,810,080 A | 3/1989 | Grendol et al. |
| 4,997,268 A | 3/1991 | Dauvergne |
| 5,007,727 A | 4/1991 | Kahaney et al. |
| 5,074,295 A | 12/1991 | Willis |
| 5,240,220 A | 8/1993 | Elberbaum |
| 5,251,635 A | 10/1993 | Dumoulin et al. |
| 5,410,763 A | 5/1995 | Bolle |
| 5,455,625 A | 10/1995 | Englander |
| 5,495,286 A | 2/1996 | Adair |
| 5,497,463 A | 3/1996 | Stein et al. |
| 5,659,701 A | 8/1997 | Amit et al. |
| 5,682,255 A | 10/1997 | Friesem et al. |
| 5,689,669 A | 11/1997 | Lynch |
| 5,826,092 A | 10/1998 | Flannery |
| 5,854,872 A | 12/1998 | Tai |
| 5,864,365 A | 1/1999 | Sramek et al. |
| 5,937,202 A | 8/1999 | Crosetto |
| 6,002,853 A | 12/1999 | De Hond |
| 6,012,811 A | 1/2000 | Chao et al. |
| 6,016,160 A | 1/2000 | Coombs et al. |
| 6,064,749 A | 5/2000 | Hirota et al. |
| 6,076,927 A | 6/2000 | Owens |
| 6,079,982 A | 6/2000 | Meader |
| 6,117,923 A | 9/2000 | Amagai et al. |
| 6,119,147 A | 9/2000 | Toomey et al. |
| 6,124,977 A | 9/2000 | Takahashi |
| 6,179,619 B1 | 1/2001 | Tanaka |
| 6,191,809 B1 | 2/2001 | Hori et al. |
| 6,219,045 B1 | 4/2001 | Leahy et al. |
| 6,243,091 B1 | 6/2001 | Berstis |
| 6,271,843 B1 | 8/2001 | Lection et al. |
| 6,362,817 B1 | 3/2002 | Powers et al. |
| 6,375,369 B1 | 4/2002 | Schneider et al. |
| 6,385,735 B1 | 5/2002 | Wilson |
| 6,396,522 B1 | 5/2002 | Vu |
| 6,414,679 B1 | 7/2002 | Miodonski et al. |
| 6,538,655 B1 | 3/2003 | Kubota |
| 6,541,736 B1 | 4/2003 | Huang et al. |
| 6,570,563 B1 | 5/2003 | Honda |
| 6,573,903 B2 | 6/2003 | Gantt |
| 6,590,593 B1 | 7/2003 | Robertson et al. |
| 6,621,508 B1 | 9/2003 | Shiraishi et al. |
| 6,690,393 B2 | 2/2004 | Heron et al. |
| 6,757,068 B2 | 6/2004 | Foxlin |
| 6,784,901 B1 | 8/2004 | Harvfey et al. |
| 6,961,055 B2 | 11/2005 | Doak |
| 7,046,515 B1 | 5/2006 | Wyatt |
| 7,051,219 B2 | 5/2006 | Hwang |
| 7,076,674 B2 | 7/2006 | Cervantes |
| 7,111,290 B1 | 9/2006 | Yates, Jr. |
| 7,119,819 B1 | 10/2006 | Robertson et al. |
| 7,219,245 B1 | 5/2007 | Raghuvanshi |
| 7,382,288 B1 | 6/2008 | Wilson |
| 7,414,629 B2 | 8/2008 | Santodomingo |
| 7,431,453 B2 | 10/2008 | Hogan |
| 7,467,356 B2 | 12/2008 | Gettman et al. |
| 7,542,040 B2 | 6/2009 | Templeman |
| 7,573,640 B2 | 8/2009 | Nivon et al. |
| 7,653,877 B2 | 1/2010 | Matsuda |
| 7,663,625 B2 | 2/2010 | Chartier et al. |
| 7,724,980 B1 | 5/2010 | Shenzhi |
| 7,746,343 B1 | 6/2010 | Charaniya et al. |
| 7,751,662 B2 | 7/2010 | Kleemann |
| 7,758,185 B2 | 7/2010 | Lewis |
| 7,788,323 B2 | 8/2010 | Greenstein et al. |
| 7,804,507 B2 | 9/2010 | Yang et al. |
| 7,814,429 B2 | 10/2010 | Buffet et al. |
| 7,817,150 B2 | 10/2010 | Reichard et al. |
| 7,844,724 B2 | 11/2010 | Van Wie et al. |
| 8,060,759 B1 | 11/2011 | Arnan et al. |
| 8,120,851 B2 | 2/2012 | Iwasa |
| 8,214,660 B2 | 7/2012 | Capps, Jr. |
| 8,246,408 B2 | 8/2012 | Elliot |
| 8,353,594 B2 | 1/2013 | Lewis |
| 8,360,578 B2 | 1/2013 | Nummela et al. |
| 8,508,676 B2 | 8/2013 | Silverstein et al. |
| 8,547,638 B2 | 10/2013 | Levola |
| 8,605,764 B1 | 10/2013 | Rothaar et al. |
| 8,619,365 B2 | 12/2013 | Harris et al. |
| 8,696,113 B2 | 4/2014 | Lewis |
| 8,698,701 B2 | 4/2014 | Margulis |
| 8,733,927 B1 | 5/2014 | Lewis |
| 8,736,636 B2 | 5/2014 | Kang |
| 8,759,929 B2 | 6/2014 | Shiozawa et al. |
| 8,793,770 B2 | 7/2014 | Lim |
| 8,823,855 B2 | 9/2014 | Hwang |
| 8,847,988 B2 | 9/2014 | Geisner et al. |
| 8,874,673 B2 | 10/2014 | Kim |
| 9,010,929 B2 | 4/2015 | Lewis |
| 9,015,501 B2 | 4/2015 | Gee |
| 9,086,537 B2 | 7/2015 | Iwasa et al. |
| 9,095,437 B2 | 8/2015 | Boyden et al. |
| 9,239,473 B2 | 1/2016 | Lewis |
| 9,244,293 B2 | 1/2016 | Lewis |
| 9,244,533 B2 | 1/2016 | Friend et al. |
| 9,383,823 B2 | 7/2016 | Geisner et al. |
| 9,489,027 B1 | 11/2016 | Ogletree |
| 9,519,305 B2 | 12/2016 | Wolfe |
| 9,581,820 B2 | 2/2017 | Robbins |
| 9,582,060 B2 | 2/2017 | Balatsos |
| 9,658,473 B2 | 5/2017 | Lewis |
| 9,671,566 B2 | 6/2017 | Abovitz et al. |
| 9,671,615 B1 | 6/2017 | Vallius et al. |
| 9,696,795 B2 | 7/2017 | Marcolina et al. |
| 9,798,144 B2 | 10/2017 | Sako et al. |
| 9,874,664 B2 | 1/2018 | Stevens et al. |
| 9,880,441 B1 | 1/2018 | Osterhout |
| 9,918,058 B2 | 3/2018 | Takahasi et al. |
| 9,955,862 B2 | 5/2018 | Freeman et al. |
| 9,978,118 B1 | 5/2018 | Ozgumer et al. |
| 9,996,797 B1 | 6/2018 | Holz et al. |
| 10,018,844 B2 | 7/2018 | Levola et al. |
| 10,082,865 B1* | 9/2018 | Raynal .............. G02B 27/0093 |
| 10,151,937 B2 | 12/2018 | Lewis |
| 10,185,147 B2 | 1/2019 | Lewis |
| 10,218,679 B1 | 2/2019 | Jawahar |
| 10,241,545 B1 | 3/2019 | Richards et al. |
| 10,317,680 B1 | 6/2019 | Richards et al. |
| 10,436,594 B2 | 10/2019 | Belt et al. |
| 10,516,853 B1 | 12/2019 | Gibson et al. |
| 10,551,879 B1 | 2/2020 | Richards et al. |
| 10,578,870 B2 | 3/2020 | Kimmel |
| 10,698,202 B2 | 6/2020 | Kimmel et al. |
| 10,856,107 B2 | 10/2020 | Mycek et al. |
| 10,825,424 B2 | 11/2020 | Zhang |
| 10,987,176 B2 | 4/2021 | Poltaretskyi et al. |

(56) References Cited

U.S. PATENT DOCUMENTS

| | | |
|---|---|---|
| 11,190,681 B1 | 11/2021 | Brook et al. |
| 11,209,656 B1 | 12/2021 | Choi et al. |
| 11,236,993 B1 | 2/2022 | Hall et al. |
| 2001/0010598 A1 | 8/2001 | Aritake et al. |
| 2001/0018667 A1 | 8/2001 | Kim |
| 2002/0007463 A1 | 1/2002 | Fung |
| 2002/0108064 A1 | 2/2002 | Nunally |
| 2002/0063913 A1 | 5/2002 | Nakamura et al. |
| 2002/0071050 A1 | 6/2002 | Homberg |
| 2002/0095463 A1 | 7/2002 | Matsuda |
| 2002/0113820 A1 | 8/2002 | Robinson et al. |
| 2002/0122648 A1 | 9/2002 | Mule' et al. |
| 2002/0140848 A1 | 10/2002 | Cooper et al. |
| 2003/0028816 A1 | 2/2003 | Bacon |
| 2003/0048456 A1 | 3/2003 | Hill |
| 2003/0067685 A1 | 4/2003 | Niv |
| 2003/0077458 A1 | 4/2003 | Korenaga et al. |
| 2003/0115494 A1 | 6/2003 | Cervantes |
| 2003/0218614 A1 | 11/2003 | Lavelle et al. |
| 2003/0219992 A1 | 11/2003 | Schaper |
| 2003/0226047 A1 | 12/2003 | Park |
| 2004/0001533 A1 | 1/2004 | Tran et al. |
| 2004/0021600 A1 | 2/2004 | Wittenberg |
| 2004/0025069 A1 | 2/2004 | Gary et al. |
| 2004/0042377 A1 | 3/2004 | Nikoloai et al. |
| 2004/0073822 A1 | 4/2004 | Greco |
| 2004/0073825 A1 | 4/2004 | Itoh |
| 2004/0111248 A1 | 6/2004 | Granny et al. |
| 2004/0113887 A1 | 6/2004 | Pair et al. |
| 2004/0174496 A1 | 9/2004 | Ji et al. |
| 2004/0186902 A1 | 9/2004 | Stewart |
| 2004/0193441 A1 | 9/2004 | Altieri |
| 2004/0201857 A1 | 10/2004 | Foxlin |
| 2004/0238732 A1 | 12/2004 | State et al. |
| 2004/0240072 A1 | 12/2004 | Schindler et al. |
| 2004/0246391 A1 | 12/2004 | Travis |
| 2004/0268159 A1 | 12/2004 | Aasheim et al. |
| 2005/0001977 A1 | 1/2005 | Zelman |
| 2005/0034002 A1 | 2/2005 | Flautner |
| 2005/0093719 A1 | 5/2005 | Okamoto et al. |
| 2005/0128212 A1 | 6/2005 | Edecker et al. |
| 2005/0157159 A1 | 7/2005 | Komiya et al. |
| 2005/0177385 A1 | 8/2005 | Hull |
| 2005/0231599 A1 | 10/2005 | Yamasaki |
| 2005/0273792 A1 | 12/2005 | Inohara et al. |
| 2006/0013435 A1 | 1/2006 | Rhoads |
| 2006/0015821 A1 | 1/2006 | Jacques Parker et al. |
| 2006/0019723 A1 | 1/2006 | Vorenkamp |
| 2006/0038880 A1 | 2/2006 | Starkweather et al. |
| 2006/0050224 A1 | 3/2006 | Smith |
| 2006/0090092 A1 | 4/2006 | Verhulst |
| 2006/0126181 A1 | 6/2006 | Levola |
| 2006/0129852 A1 | 6/2006 | Bonola |
| 2006/0132914 A1 | 6/2006 | Weiss et al. |
| 2006/0179329 A1 | 8/2006 | Terechko |
| 2006/0221448 A1 | 10/2006 | Nivon et al. |
| 2006/0228073 A1 | 10/2006 | Mukawa et al. |
| 2006/0250322 A1 | 11/2006 | Hall et al. |
| 2006/0259621 A1 | 11/2006 | Ranganathan |
| 2006/0268220 A1 | 11/2006 | Hogan |
| 2007/0058248 A1 | 3/2007 | Nguyen et al. |
| 2007/0103836 A1 | 5/2007 | Oh |
| 2007/0124730 A1 | 5/2007 | Pytel |
| 2007/0159673 A1 | 7/2007 | Freeman et al. |
| 2007/0188837 A1 | 8/2007 | Shimizu et al. |
| 2007/0198886 A1 | 8/2007 | Saito |
| 2007/0204672 A1 | 9/2007 | Huang et al. |
| 2007/0213952 A1 | 9/2007 | Cirelli |
| 2007/0283247 A1 | 12/2007 | Brenneman et al. |
| 2008/0002259 A1 | 1/2008 | Ishizawa et al. |
| 2008/0002260 A1 | 1/2008 | Arrouy et al. |
| 2008/0030429 A1 | 2/2008 | Hailpern |
| 2008/0043334 A1 | 2/2008 | Itzkovitch et al. |
| 2008/0046773 A1 | 2/2008 | Ham |
| 2008/0063802 A1 | 3/2008 | Maula et al. |
| 2008/0068557 A1 | 3/2008 | Menduni et al. |
| 2008/0125218 A1 | 5/2008 | Collins |
| 2008/0146942 A1 | 6/2008 | Dala-Krishna |
| 2008/0173036 A1 | 7/2008 | Willaims |
| 2008/0177506 A1 | 7/2008 | Kim |
| 2008/0205838 A1 | 8/2008 | Crippa et al. |
| 2008/0215907 A1 | 9/2008 | Wilson |
| 2008/0225393 A1 | 9/2008 | Rinko |
| 2008/0235570 A1 | 9/2008 | Sawada et al. |
| 2008/0246693 A1 | 10/2008 | Hailpern et al. |
| 2008/0316768 A1 | 12/2008 | Travis |
| 2009/0076791 A1 | 3/2009 | Rhoades et al. |
| 2009/0091583 A1 | 4/2009 | Mccoy |
| 2009/0153797 A1 | 6/2009 | Allon et al. |
| 2009/0224416 A1 | 9/2009 | Laakkonen et al. |
| 2009/0245730 A1 | 10/2009 | Kleemann |
| 2009/0287728 A1 | 11/2009 | Martine et al. |
| 2009/0300528 A1 | 12/2009 | Stambaugh |
| 2009/0310633 A1 | 12/2009 | Ikegami |
| 2010/0005326 A1 | 1/2010 | Archer |
| 2010/0019962 A1 | 1/2010 | Fujita |
| 2010/0056274 A1 | 3/2010 | Uusitalo et al. |
| 2010/0063854 A1 | 3/2010 | Purvis et al. |
| 2010/0070378 A1 | 3/2010 | Trotman et al. |
| 2010/0079841 A1 | 4/2010 | Levola |
| 2010/0115428 A1 | 5/2010 | Shuping et al. |
| 2010/0153934 A1 | 6/2010 | Lachner |
| 2010/0194632 A1 | 8/2010 | Raento et al. |
| 2010/0205541 A1 | 8/2010 | Rappaport et al. |
| 2010/0214284 A1 | 8/2010 | Rieffel et al. |
| 2010/0232016 A1 | 9/2010 | Landa et al. |
| 2010/0232031 A1 | 9/2010 | Batchko et al. |
| 2010/0244168 A1 | 9/2010 | Shiozawa et al. |
| 2010/0274567 A1 | 10/2010 | Carlson et al. |
| 2010/0274627 A1 | 10/2010 | Carlson |
| 2010/0277803 A1 | 11/2010 | Pockett et al. |
| 2010/0284085 A1 | 11/2010 | Laakkonen |
| 2010/0296163 A1 | 11/2010 | Sarikko |
| 2010/0309687 A1 | 12/2010 | Sampsell et al. |
| 2011/0010636 A1 | 1/2011 | Hamilton, II et al. |
| 2011/0021263 A1 | 1/2011 | Anderson et al. |
| 2011/0022870 A1 | 1/2011 | Mcgrane |
| 2011/0041083 A1 | 2/2011 | Gabai et al. |
| 2011/0050640 A1 | 3/2011 | Lundback et al. |
| 2011/0050655 A1 | 3/2011 | Mukawa |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2012/0011389 A1 | 1/2012 | Driesen |
| 2012/0050535 A1 | 3/2012 | Densham et al. |
| 2012/0075501 A1 | 3/2012 | Oyagi et al. |
| 2012/0081392 A1 | 4/2012 | Arthur |
| 2012/0089854 A1 | 4/2012 | Breakstone |
| 2012/0113235 A1 | 5/2012 | Shintani |
| 2012/0127062 A1 | 5/2012 | Bar-Zeev et al. |
| 2012/0154557 A1 | 6/2012 | Perez et al. |
| 2012/0215094 A1 | 8/2012 | Rahimian et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1 | 10/2012 | Maciocci et al. |
| 2012/0260083 A1 | 10/2012 | Andrews |
| 2012/0307075 A1 | 12/2012 | Margalit |
| 2012/0307362 A1 | 12/2012 | Silverstein et al. |
| 2012/0314959 A1 | 12/2012 | White et al. |
| 2012/0320460 A1 | 12/2012 | Levola |
| 2012/0326948 A1 | 12/2012 | Crocco et al. |
| 2013/0021486 A1 | 1/2013 | Richardon |
| 2013/0050258 A1 | 2/2013 | Liu et al. |
| 2013/0050642 A1 | 2/2013 | Lewis et al. |
| 2013/0050833 A1 | 2/2013 | Lewis et al. |
| 2013/0051730 A1 | 2/2013 | Travers et al. |
| 2013/0061240 A1 | 3/2013 | Yan et al. |
| 2013/0077049 A1 | 3/2013 | Bohn |
| 2013/0077170 A1 | 3/2013 | Ukuda |
| 2013/0094148 A1 | 4/2013 | Sloane |

(56) References Cited

U.S. PATENT DOCUMENTS

| | | |
|---|---|---|
| 2013/0129282 A1 | 5/2013 | Li |
| 2013/0162940 A1 | 6/2013 | Kurtin et al. |
| 2013/0169923 A1 | 7/2013 | Schnoll et al. |
| 2013/0205126 A1 | 8/2013 | Kruglick |
| 2013/0222386 A1 | 8/2013 | Tannhauser et al. |
| 2013/0268257 A1 | 10/2013 | Hu |
| 2013/0278633 A1 | 10/2013 | Ahn et al. |
| 2013/0314789 A1 | 11/2013 | Saarikko et al. |
| 2013/0318276 A1 | 11/2013 | Dalal |
| 2013/0336138 A1 | 12/2013 | Venkatraman et al. |
| 2013/0342564 A1 | 12/2013 | Kinnebrew et al. |
| 2013/0342570 A1 | 12/2013 | Kinnebrew et al. |
| 2013/0342571 A1 | 12/2013 | Kinnebrew et al. |
| 2013/0343408 A1 | 12/2013 | Cook |
| 2014/0002329 A1 | 1/2014 | Nishimaki et al. |
| 2014/0013098 A1 | 1/2014 | Yeung |
| 2014/0016821 A1 | 1/2014 | Arth et al. |
| 2014/0022819 A1 | 1/2014 | Oh et al. |
| 2014/0078023 A1 | 3/2014 | Ikeda et al. |
| 2014/0082526 A1 | 3/2014 | Park et al. |
| 2014/0119598 A1 | 5/2014 | Ramachandran et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |
| 2014/0244983 A1 | 8/2014 | McDonald et al. |
| 2014/0266987 A1 | 9/2014 | Magyari |
| 2014/0267419 A1 | 9/2014 | Ballard et al. |
| 2014/0274391 A1 | 9/2014 | Stafford |
| 2014/0282105 A1 | 9/2014 | Nordstrom |
| 2014/0313228 A1 | 10/2014 | Kasahara |
| 2014/0340449 A1 | 11/2014 | Plagemann et al. |
| 2014/0359589 A1 | 12/2014 | Kodsky et al. |
| 2014/0375680 A1 | 12/2014 | Ackerman et al. |
| 2015/0005785 A1 | 1/2015 | Olson |
| 2015/0009099 A1 | 1/2015 | Queen |
| 2015/0077312 A1 | 3/2015 | Wang |
| 2015/0097719 A1 | 4/2015 | Balachandreswaran et al. |
| 2015/0123966 A1 | 5/2015 | Newman |
| 2015/0130790 A1 | 5/2015 | Vasquez, II et al. |
| 2015/0134995 A1 | 5/2015 | Park et al. |
| 2015/0138248 A1 | 5/2015 | Schrader |
| 2015/0155939 A1 | 6/2015 | Oshima et al. |
| 2015/0168221 A1 | 6/2015 | Mao et al. |
| 2015/0205126 A1 | 7/2015 | Schowengerdt |
| 2015/0235427 A1 | 8/2015 | Nobori et al. |
| 2015/0235431 A1 | 8/2015 | Schowengerdt |
| 2015/0253651 A1 | 9/2015 | Russell et al. |
| 2015/0256484 A1 | 9/2015 | Cameron |
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0310657 A1* | 10/2015 | Eden ............ G06F 3/013 345/441 |
| 2015/0338915 A1 | 11/2015 | Publicover et al. |
| 2015/0355481 A1 | 12/2015 | Hilkes et al. |
| 2016/0004102 A1 | 1/2016 | Nisper et al. |
| 2016/0015470 A1 | 1/2016 | Border |
| 2016/0027215 A1 | 1/2016 | Burns et al. |
| 2016/0033770 A1 | 2/2016 | Fujimaki et al. |
| 2016/0051217 A1 | 2/2016 | Douglas et al. |
| 2016/0077338 A1 | 3/2016 | Robbins et al. |
| 2016/0085285 A1 | 3/2016 | Mangione-Smith |
| 2016/0085300 A1 | 3/2016 | Robbins et al. |
| 2016/0091720 A1* | 3/2016 | Stafford ............ G02B 27/0172 345/8 |
| 2016/0093099 A1 | 3/2016 | Bridges |
| 2016/0093269 A1 | 3/2016 | Buckley et al. |
| 2016/0103326 A1 | 4/2016 | Kimura et al. |
| 2016/0123745 A1 | 5/2016 | Cotier et al. |
| 2016/0139402 A1 | 5/2016 | Lapstun |
| 2016/0139411 A1 | 5/2016 | Kang et al. |
| 2016/0155273 A1 | 6/2016 | Lyren et al. |
| 2016/0180596 A1 | 6/2016 | Gonzalez del Rosario |
| 2016/0187654 A1 | 6/2016 | Border et al. |
| 2016/0191887 A1 | 6/2016 | Casas |
| 2016/0202496 A1 | 7/2016 | Billetz et al. |
| 2016/0217624 A1 | 7/2016 | Finn et al. |
| 2016/0266412 A1 | 9/2016 | Yoshida |
| 2016/0267708 A1 | 9/2016 | Nistico et al. |
| 2016/0274733 A1 | 9/2016 | Hasegawa et al. |
| 2016/0287337 A1 | 10/2016 | Aram et al. |
| 2016/0300388 A1 | 10/2016 | Stafford et al. |
| 2016/0321551 A1 | 11/2016 | Priness et al. |
| 2016/0327798 A1 | 11/2016 | Xiao et al. |
| 2016/0334279 A1 | 11/2016 | Mittleman et al. |
| 2016/0357255 A1 | 12/2016 | Lindh et al. |
| 2016/0370404 A1 | 12/2016 | Quadrat et al. |
| 2016/0370510 A1 | 12/2016 | Thomas |
| 2017/0038607 A1 | 2/2017 | Camara |
| 2017/0060225 A1 | 3/2017 | Zha et al. |
| 2017/0061696 A1 | 3/2017 | Li et al. |
| 2017/0064066 A1 | 3/2017 | Das et al. |
| 2017/0100664 A1 | 4/2017 | Osterhout et al. |
| 2017/0102544 A1 | 4/2017 | Vallius et al. |
| 2017/0115487 A1 | 4/2017 | Travis |
| 2017/0122725 A1 | 5/2017 | Yeoh et al. |
| 2017/0123526 A1* | 5/2017 | Trail .................... G06V 40/193 |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0161951 A1 | 6/2017 | Fix et al. |
| 2017/0185261 A1 | 6/2017 | Perez et al. |
| 2017/0192239 A1 | 7/2017 | Nakamura et al. |
| 2017/0201709 A1 | 7/2017 | Igarashi et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0214907 A1 | 7/2017 | Lapstun |
| 2017/0219841 A1 | 8/2017 | Popovich et al. |
| 2017/0232345 A1 | 8/2017 | Rofougaran et al. |
| 2017/0235126 A1 | 8/2017 | DiDomenico |
| 2017/0235129 A1 | 8/2017 | Kamakura |
| 2017/0235142 A1 | 8/2017 | Wall et al. |
| 2017/0235144 A1 | 8/2017 | Piskunov et al. |
| 2017/0235147 A1 | 8/2017 | Kamakura |
| 2017/0243403 A1 | 8/2017 | Daniels et al. |
| 2017/0246070 A1 | 8/2017 | Osterhout et al. |
| 2017/0254832 A1 | 9/2017 | Ho et al. |
| 2017/0256096 A1 | 9/2017 | Faaborg et al. |
| 2017/0258526 A1 | 9/2017 | Lang |
| 2017/0266529 A1 | 9/2017 | Reikmoto |
| 2017/0270712 A1 | 9/2017 | Tyson et al. |
| 2017/0281054 A1 | 10/2017 | Stever et al. |
| 2017/0287376 A1 | 10/2017 | Bakar et al. |
| 2017/0293141 A1 | 10/2017 | Schowengerdt et al. |
| 2017/0307886 A1 | 10/2017 | Stenberg et al. |
| 2017/0307891 A1 | 10/2017 | Bucknor et al. |
| 2017/0312032 A1 | 11/2017 | Amanatullah et al. |
| 2017/0322418 A1 | 11/2017 | Liu et al. |
| 2017/0322426 A1 | 11/2017 | Tervo |
| 2017/0329137 A1 | 11/2017 | Tervo |
| 2017/0332098 A1 | 11/2017 | Rusanovskyy et al. |
| 2017/0336636 A1 | 11/2017 | Amitai et al. |
| 2017/0357332 A1 | 12/2017 | Balan et al. |
| 2017/0363871 A1 | 12/2017 | Vallius |
| 2017/0371394 A1 | 12/2017 | Chan |
| 2017/0371661 A1 | 12/2017 | Sparling |
| 2018/0014266 A1 | 1/2018 | Chen |
| 2018/0024289 A1 | 1/2018 | Fattal |
| 2018/0044173 A1 | 2/2018 | Netzer |
| 2018/0052007 A1 | 2/2018 | Teskey et al. |
| 2018/0052501 A1 | 2/2018 | Jones, Jr. et al. |
| 2018/0059305 A1 | 3/2018 | Popovich et al. |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0084245 A1 | 3/2018 | Lapstun |
| 2018/0088185 A1 | 3/2018 | Woods et al. |
| 2018/0102981 A1 | 4/2018 | Kurtzman et al. |
| 2018/0108179 A1 | 4/2018 | Tomlin et al. |
| 2018/0114298 A1 | 4/2018 | Malaika et al. |
| 2018/0129112 A1 | 5/2018 | Osterhout |

(56) References Cited

U.S. PATENT DOCUMENTS

| | | | |
|---|---|---|---|
| 2018/0131907 A1 | 5/2018 | Schmirier et al. |
| 2018/0136466 A1 | 5/2018 | Ko |
| 2018/0144691 A1 | 5/2018 | Choi et al. |
| 2018/0150971 A1 | 5/2018 | Adachi et al. |
| 2018/0151796 A1 | 5/2018 | Akahane |
| 2018/0172995 A1 | 6/2018 | Lee et al. |
| 2018/0188115 A1 | 7/2018 | Hsu et al. |
| 2018/0189568 A1* | 7/2018 | Powderly ............... G06F 3/011 |
| 2018/0190017 A1 | 7/2018 | Mendez et al. |
| 2018/0191990 A1 | 7/2018 | Motoyama et al. |
| 2018/0217395 A1 | 8/2018 | Lin et al. |
| 2018/0218545 A1 | 8/2018 | Garcia et al. |
| 2018/0250589 A1 | 9/2018 | Cossairt et al. |
| 2018/0260218 A1 | 9/2018 | Gopal |
| 2018/0284877 A1 | 10/2018 | Klein |
| 2018/0292654 A1 | 10/2018 | Wall et al. |
| 2018/0299678 A1 | 10/2018 | Singer et al. |
| 2018/0357472 A1 | 12/2018 | Dreessen |
| 2019/0005069 A1 | 1/2019 | Filgueiras de Araujo et al. |
| 2019/0011691 A1 | 1/2019 | Peyman |
| 2019/0056591 A1 | 2/2019 | Tervo et al. |
| 2019/0087015 A1 | 3/2019 | Lam et al. |
| 2019/0101758 A1 | 4/2019 | Zhu et al. |
| 2019/0107723 A1 | 4/2019 | Lee et al. |
| 2019/0137788 A1 | 5/2019 | Suen |
| 2019/0155034 A1 | 5/2019 | Singer et al. |
| 2019/0155439 A1 | 5/2019 | Mukherjee et al. |
| 2019/0158926 A1 | 5/2019 | Kang et al. |
| 2019/0162950 A1 | 5/2019 | Lapstun |
| 2019/0167095 A1 | 6/2019 | Krueger |
| 2019/0172216 A1 | 6/2019 | Ninan et al. |
| 2019/0178654 A1 | 6/2019 | Hare |
| 2019/0182415 A1 | 6/2019 | Sivan |
| 2019/0196690 A1 | 6/2019 | Chong et al. |
| 2019/0206116 A1 | 7/2019 | Xu et al. |
| 2019/0219815 A1 | 7/2019 | Price et al. |
| 2019/0243123 A1 | 8/2019 | Bohn |
| 2019/0287270 A1 | 9/2019 | Nakamura et al. |
| 2019/0318502 A1 | 10/2019 | He et al. |
| 2019/0318540 A1 | 10/2019 | Piemonte et al. |
| 2019/0321728 A1 | 10/2019 | Imai et al. |
| 2019/0347853 A1 | 11/2019 | Chen et al. |
| 2019/0380792 A1 | 12/2019 | Poltaretskyi et al. |
| 2019/0388182 A1 | 12/2019 | Kumar et al. |
| 2020/0066045 A1 | 2/2020 | Stahl et al. |
| 2020/0098188 A1 | 3/2020 | Bar-Zeev et al. |
| 2020/0100057 A1 | 3/2020 | Galon et al. |
| 2020/0110928 A1 | 4/2020 | Al Jazaery et al. |
| 2020/0117267 A1 | 4/2020 | Gibson et al. |
| 2020/0117270 A1 | 4/2020 | Gibson et al. |
| 2020/0184217 A1 | 6/2020 | Faulkner |
| 2020/0184653 A1 | 6/2020 | Faulker |
| 2020/0202759 A1 | 6/2020 | Ukai et al. |
| 2020/0242848 A1 | 7/2020 | Ambler et al. |
| 2020/0309944 A1 | 10/2020 | Thoresen et al. |
| 2020/0356161 A1 | 11/2020 | Wagner |
| 2020/0368616 A1 | 11/2020 | Delamont |
| 2020/0391115 A1 | 12/2020 | Leeper et al. |
| 2020/0409528 A1 | 12/2020 | Lee |
| 2021/0008413 A1 | 1/2021 | Asikainen et al. |
| 2021/0033871 A1 | 2/2021 | Jacoby et al. |
| 2021/0041951 A1 | 2/2021 | Gibson et al. |
| 2021/0053820 A1 | 2/2021 | Gurin et al. |
| 2021/0093391 A1 | 4/2021 | Poltaretskyi et al. |
| 2021/0093410 A1 | 4/2021 | Gaborit et al. |
| 2021/0093414 A1 | 4/2021 | Moore et al. |
| 2021/0097886 A1 | 4/2021 | Kuester et al. |
| 2021/0132380 A1 | 5/2021 | Wieczorek |
| 2021/0141225 A1 | 5/2021 | Meynen et al. |
| 2021/0142582 A1 | 5/2021 | Jones et al. |
| 2021/0158627 A1 | 5/2021 | Cossairt et al. |
| 2021/0173480 A1 | 6/2021 | Osterhout et al. |
| 2022/0366598 A1 | 11/2022 | Azimi et al. |

FOREIGN PATENT DOCUMENTS

| | | |
|---|---|---|
| CN | 104040410 A | 9/2014 |
| CN | 104603675 A | 5/2015 |
| CN | 105938426 A | 9/2016 |
| CN | 107683497 A1 | 2/2018 |
| CN | 109223121 A | 1/2019 |
| CN | 105190427 B | 11/2019 |
| EP | 0504930 A1 | 3/1992 |
| EP | 0535402 A1 | 4/1993 |
| EP | 0632360 A1 | 1/1995 |
| EP | 1215522 A2 | 6/2002 |
| EP | 1494110 A2 | 1/2005 |
| EP | 1938141 A1 | 7/2008 |
| EP | 1943556 A2 | 7/2008 |
| EP | 2290428 A2 | 3/2011 |
| EP | 2350774 A1 | 8/2011 |
| EP | 1237067 B1 | 1/2016 |
| EP | 3139245 A1 | 3/2017 |
| EP | 3164776 B1 | 5/2017 |
| EP | 3236211 A1 | 10/2017 |
| EP | 2723240 B1 | 8/2018 |
| EP | 2896986 B1 | 2/2021 |
| GB | 2499635 A | 8/2013 |
| GB | 2542853 A | 4/2017 |
| IN | 938/DEL/2004 | 6/2006 |
| IN | 106662754 A | 5/2017 |
| JP | H03-036974 U | 4/1991 |
| JP | H10-333094 A | 12/1998 |
| JP | 2002-529806 | 9/2002 |
| JP | 2003-029198 A | 1/2003 |
| JP | 2003-141574 A | 5/2003 |
| JP | 2003-228027 A | 8/2003 |
| JP | 2003-329873 A | 11/2003 |
| JP | 2005-303843 A | 10/2005 |
| JP | 2007-012530 A | 1/2007 |
| JP | 2007-86696 A | 4/2007 |
| JP | 2007-273733 A | 10/2007 |
| JP | 2008-257127 A | 10/2008 |
| JP | 2009-090689 A | 4/2009 |
| JP | 2009-244869 A | 10/2009 |
| JP | 2010014443 A | 1/2010 |
| JP | 2010-139575 | 6/2010 |
| JP | 2011-033993 A | 2/2011 |
| JP | 2011-257203 A | 12/2011 |
| JP | 2011-530131 A | 12/2011 |
| JP | 2012-015774 A | 1/2012 |
| JP | 2012-235036 A | 11/2012 |
| JP | 2013-525872 A1 | 6/2013 |
| JP | 2014-500522 A | 1/2014 |
| JP | 2014-192550 A | 10/2014 |
| JP | 2015-191032 A | 11/2015 |
| JP | 2016-502120 A | 1/2016 |
| JP | 2016-85463 A | 5/2016 |
| JP | 2016-516227 A | 6/2016 |
| JP | 2016-126134 A | 7/2016 |
| JP | 2017-015697 A | 1/2017 |
| JP | 2017-153498 | 9/2017 |
| JP | 2017-531840 A | 10/2017 |
| JP | 2017-535825 A | 11/2017 |
| JP | 6232763 B2 | 11/2017 |
| JP | 6333965 B2 | 5/2018 |
| KR | 2005-0010775 A | 1/2005 |
| KR | 10-2006-0059992 A | 6/2006 |
| KR | 10-1372623 B1 | 3/2014 |
| TW | 201219829 A | 5/2012 |
| TW | 201803289 A | 1/2018 |
| WO | 1991/000565 A2 | 1/1991 |
| WO | 2000/030368 A1 | 6/2000 |
| WO | 2002/071315 A2 | 9/2002 |
| WO | 2004095248 A | 11/2004 |
| WO | 2006132614 A1 | 12/2006 |
| WO | 2007041678 A2 | 4/2007 |
| WO | 2007/037089 A1 | 5/2007 |
| WO | 2007/085682 A1 | 8/2007 |
| WO | 2007/102144 A1 | 9/2007 |
| WO | 2008148927 A1 | 12/2008 |
| WO | 2009/101238 A1 | 8/2009 |
| WO | 2010015807 A1 | 2/2010 |

(56) References Cited

FOREIGN PATENT DOCUMENTS

| WO | 2014203440 | A1 | 12/2010 |
|---|---|---|---|
| WO | 2012030787 | A2 | 3/2012 |
| WO | 2013/049012 | A1 | 4/2013 |
| WO | 2013062701 | A1 | 5/2013 |
| WO | 2014033306 | A1 | 3/2014 |
| WO | 2015/143641 | A1 | 10/2015 |
| WO | 2015143641 | A1 | 10/2015 |
| WO | 2016/054092 | A1 | 4/2016 |
| WO | 2017004695 | A1 | 1/2017 |
| WO | 2017044761 | A1 | 3/2017 |
| WO | 2017049163 | A1 | 3/2017 |
| WO | 2017051595 | A1 | 3/2017 |
| WO | 2017120475 | A1 | 7/2017 |
| WO | 2017176861 | A1 | 10/2017 |
| WO | 2017/203201 | A1 | 11/2017 |
| WO | 2017203201 | A1 | 11/2017 |
| WO | 2018008232 | A1 | 1/2018 |
| WO | 2018/031261 | A1 | 2/2018 |
| WO | 2018022523 | A1 | 2/2018 |
| WO | 2018/044537 | A1 | 3/2018 |
| WO | 2018039273 | A1 | 3/2018 |
| WO | 2018057564 | A1 | 3/2018 |
| WO | 2018085287 | A1 | 5/2018 |
| WO | 2018087408 | A1 | 5/2018 |
| WO | 2018097831 | A1 | 5/2018 |
| WO | 2018166921 | A1 | 9/2018 |
| WO | 2018236587 | A1 | 12/2018 |
| WO | 2019040493 | A1 | 2/2019 |
| WO | 2019148154 | A1 | 8/2019 |
| WO | 2020010226 | A1 | 1/2020 |

OTHER PUBLICATIONS

Communication Pursuant to Article 94(3) EPC dated Sep. 4, 2019, European Patent Application No. 10793707.0, (4 pages).
Communication Pursuant to Article 94(3) EPC dated Jan. 4, 2022, European Patent Application No. 20154070.5, (8 pages).
Communication Pursuant to Article 94(3) EPC dated Oct. 21, 2021, European Patent Application No. 16207441.3, (4 pages).
Communication Pursuant to Rule 164(1) EPC dated Jul. 27, 2021, European Patent Application No. 19833664.6, (11 pages).
European Search Report dated Oct. 15, 2020, European Patent Application No. 20180623.9, (10 pages).
Examination Report dated Jun. 19, 2020, European Patent Application No. 20154750.2, (10 pages).
Extended European Search Report dated May 20, 2020, European Patent Application No. 20154070.5, (7 pages).
Extended European Search Report dated Jan. 22, 2021, European Patent Application No. 18890390.0, (11 pages).
Extended European Search Report dated Nov. 3, 2020, European Patent Application No. 18885707.2, (7 pages).
Extended European Search Report dated Jun. 30, 2021, European Patent Application No. 19811971.1, (9 pages).
Extended European Search Report dated Mar. 4, 2021, European Patent Application No. 19768418.6, (9 pages).
Extended European Search Report dated Nov. 4, 2020, European Patent Application No. 20190980.1, (14 pages).
Extended European Search Report dated Jun. 12, 2017, European Patent Application No. 16207441.3, (8 pages).
Extended European Search Report dated Jul. 16, 2021, European Patent Application No. 19810142.0, (14 pages).
Extended European Search Report dated Jul. 30, 2021, European Patent Application No. 19839970.1, (7 pages).
Extended European Search Report dated Oct. 27, 2021, European Patent Application No. 19833664.6, (10 pages).
Extended European Search Report dated Sep. 20, 2021, European Patent Application No. 19851373.1, (8 pages).
Extended European Search Report dated Sep. 28, 2021, European Patent Application No. 19845418.3, (13 pages).
Final Office Action dated Aug. 10, 2020, U.S. Appl. No. 16/225,961, (13 pages).
Final Office Action dated Dec. 4, 2019, U.S. Appl. No. 15/564,517, (15 pages).
Final Office Action dated Feb. 19, 2020, U.S. Appl. No. 15/552,897, (17 pages).
Final Office Action dated Jun. 15, 2021, U.S. Appl. No. 16/928,313, (42 pages).
Final Office Action dated Mar. 1, 2021, U.S. Appl. No. 16/214,575, (29 pages).
Final Office Action dated Mar. 19, 2021, U.S. Appl. No. 16/530,776, (25 pages).
Final Office Action dated Nov. 24, 2020, U.S. Appl. No. 16/435,933, (44 pages).
Final Office Action dated Sep. 17, 2021, U.S. Appl. No. 16/938,782, (44 pages).
International Search Report and Written Opinion mailed on Feb. 12, 2021, International Application No. PCT/US20/60555, (25 pages).
International Search Report and Written Opinion dated Mar. 12, 2020, International PCT Patent Application No. PCT/US19/67919, (14 pages).
International Search Report and Written Opinion dated Aug. 15, 2019, International PCT Patent Application No. PCT/US19/33987, (20 pages).
International Search Report and Written Opinion dated Jun. 15, 2020, International PCT Patent Application No. PCT/US2020/017023, (13 pages).
International Search Report and Written Opinion dated Oct. 16, 2019, International PCT Patent Application No. PCT/US19/43097, (10 pages).
International Search Report and Written Opinion dated Oct. 16, 2019, International PCT Patent Application No. PCT/US19/36275, (10 pages).
International Search Report and Written Opinion dated Oct. 16, 2019, International PCT Patent Application No. PCT/US19/43099, (9 pages).
International Search Report and Written Opinion dated Jun. 17, 2016, International PCT Patent Application No. PCT/FI2016/050172, (9 pages).
International Search Report and Written Opinion dated Feb. 2, 2021, International PCT Patent Application No. PCT/US20/60550, (9 pages).
International Search Report and Written Opinion dated Oct. 22, 2019, International PCT Patent Application No. PCT/US19/43751, (9 pages).
International Search Report and Written Opinion dated Dec. 23, 2019, International PCT Patent Application No. PCT/US19/44953, (11 pages).
International Search Report and Written Opinion dated May 23, 2019, International PCT Patent Application No. PCT/US18/66514, (17 pages).
International Search Report and Written Opinion dated Sep. 26, 2019, International PCT Patent Application No. PCT/US19/40544, (12 pages).
International Search Report and Written Opinion dated Aug. 27, 2019, International PCT Application No. PCT/US2019/035245, (8 pages).
International Search Report and Written Opinion dated Dec. 27, 2019, International Application No. PCT/US19/47746, (16 pages).
International Search Report and Written Opinion dated Dec. 3, 2020, International Patent Application No. PCT/US20/43596, (25 pages).
International Search Report and Written Opinion dated Sep. 30, 2019, International Patent Application No. PCT/US19/40324, (7 pages).
International Search Report and Written Opinion dated Sep. 4, 2020, International Patent Application No. PCT/US20/31036, (13 pages).
International Search Report and Written Opinion dated Jun. 5, 2020, International Patent Application No. PCT/US20/19871, (9 pages).
International Search Report and Written Opinion dated Aug. 8, 2019, International PCT Patent Application No. PCT/US2019/034763, (8 pages).
International Search Report and Written Opinion dated Oct. 8, 2019, International PCT Patent Application No. PCT/US19/41151, (7 pages).

(56) References Cited

OTHER PUBLICATIONS

International Search Report and Written Opinion dated Jan. 9, 2020, International Application No. PCT/US19/55185, (10 pages).
International Search Report and Written Opinion dated Feb. 28, 2019, International Patent Application No. PCT/US18/64686, (8 pages).
International Search Report and Written Opinion dated Feb. 7, 2020, International PCT Patent Application No. PCT/US2019/061265, (11 pages).
International Search Report and Written Opinion dated Jun. 11, 2019, International PCT Application No. PCT/US19/22620, (7 pages).
Invitation to Pay Additional Fees dated Aug. 15, 2019, International PCT Patent Application No. PCT/US19/36275, (2 pages).
Invitation to Pay Additional Fees dated Sep. 24, 2020, International Patent Application No. PCT/US2020/043596, (3 pages).
Invitation to Pay Additional Fees dated Oct. 22, 2019, International PCT Patent Application No. PCT/US19/47746, (2 pages).
Invitation to Pay Additional Fees dated Apr. 3, 2020, International Patent Application No. PCT/US20/17023, (2 pages).
Invitation to Pay Additional Fees dated Oct. 17, 2019, International PCT Patent Application No. PCT/US19/44953, (2 pages).
"multi-core processor", TechTarget, 2013, (1 page).
Non Final Office Action dated Nov. 19. 2019, U.S. Appl. No. 16/355,611, (31 pages).
Non Final Office Action dated Aug. 21, 2019, U.S. Appl. No. 15/564,517, (14 pages).
Non Final Office Action dated Aug. 4, 2021, U.S. Appl. No. 16/864,721, (51 pages).
Non Final Office Action dated Jan. 26, 2021, U.S. Appl. No. 16/928,313, (33 pages).
Non Final Office Action dated Jan. 27, 2021, U.S. Appl. No. 16/225,961, (15 pages).
Non Final Office Action dated Jul. 27, 2020, U.S. Appl. No. 16/435,933, (16 pages).
Non Final Office Action dated Jul. 9, 2021, U.S. Appl. No. 17/002,663, (43 pages).
Non Final Office Action dated Jul. 9, 2021, U.S. Appl. No. 16/833,093, (47 pages).
Non Final Office Action dated Jun. 10, 2021, U.S. Appl. No. 16/938,782, (40 Pages).
Non Final Office Action dated Jun. 17, 2020, U.S. Appl. No. 16/682,911, (22 pages).
Non Final Office Action dated Jun. 19, 2020, U.S. Appl. No. 16/225,961, (35 pages).
Non Final Office Action dated Jun. 29, 2021, U.S. Appl. No. 16/698,588, (58 pages).
Non Final Office Action dated Mar. 3, 2021, U.S. Appl. No. 16/427,337, (41 pages).
Non Final Office Action dated May 26, 2021, U.S. Appl. No. 16/214,575, (19 pages).
Non Final Office Action dated Nov. 5, 2020, U.S. Appl. No. 16/530,776, (45 pages).
Non Final Office Action dated Oct. 22, 2019, U.S. Appl. No. 15/859,277, (15 pages).
Non Final Office Action dated Sep. 1, 2020, U.S. Appl. No. 16/214,575, (40 pages).
Non Final Office Action dated Sep. 20, 2021, U.S. Appl. No. 17/105,848, (56 pages).
Non Final Office Action dated Sep. 29, 2021, U.S. Appl. No. 16/748,193, (62 pages).
Notice of Allowance dated Mar. 25, 2020, U.S. Appl. No. 15/564,517, (11 pages).
Notice of Allowance dated Oct. 5, 2020, U.S. Appl. No. 16/682,911, (27 pages).
Notice of Reason of Refusal dated Sep. 11, 2020 with English translation, Japanese Patent Application No. 2019-140435, (6 pages).
"Phototourism Challenge", CVPR 2019 Image Matching Workshop. https://image matching-workshop. github.io., (16 pages).
"Summons to attend oral proceedings pursuant to Rule 115(1) EPC mailed on Jul. 15, 2019", European Patent Application No. 15162521.7, (7 pages).
Aarik, J., et al. ,"Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351?via%3Dihub>; DOI: 10.1016/S0040-6090(97)00135-1; see entire document, (2 pages).
Altwaijry, et al. ,"Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021)] < URL: http://www.bmva.org/bmvc/2016/papers/paper049/index.html >, en lire document, especially Abstract.
Arandjelović, Relja, et al. ,"Three things everyone should know to improve object retrieval", CVPR, 2012, (8 pages).
Azom, "Silica—Silicon Dioxide (SiO2)", AZO Materials; Publication [Online]. Dec. 13, 2001 [retrieved Feb. 19, 2020]. Retrieved from the Internet: <URL: https://www.azom.com/article.aspx?ArticleID=1114>.
Azuma, Ronald T. ,"A Survey of Augmented Reality", Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).
Azuma, Ronald T. ,"Predictive Tracking for Augmented Reality", Department of Computer Science, Chapel Hill NC; TR95-007, Feb. 1995, 262 pages.
Battaglia, Peter W, et al. ,"Relational inductive biases, deep learning, and graph networks", arXiv:1806.01261, Oct. 17, 2018, pp. 1-40.
Berg, Alexander C, et al. ,"Shape matching and object recognition using low distortion correspondences", In CVPR, 2005, (8 pages).
Bian, Jiawang, et al. , "GMS: Grid-based motion statistics for fast, ultra-robust feature correspondence.", In CVPR (Conference on Computer Vision and Pattern Recognition), 2017, (10 pages).
Bimber, Oliver, et al. ,"Spatial Augmented Reality: Merging Real and Virtual Worlds" https://web.media.mit.edu/~raskar/book/BimberRaskarAugmentedRealityBook.pdf; published by A K Peters/CRC Press (Jul. 31, 2005); eBook (3rd Edition, 2007), (393 pages).
Brachmann, Eric, et al. ,"Neural-Guided RANSAC: Learning Where to Sample Model Hypotheses", In ICCV (International Conference on Computer Vision ), arXiv:1905.04132v2 [cs.CV] Jul. 31, 2019, (17 pages).
Butail, et al. ,"Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http:/lcdcl.umd.edu/papers/icra2012.pdf> entire document.
Caetano, Tibério S, et al. , "Learning graph matching", IEEE TPAMI, 31(6):1048-1058, 2009.
Cech, Jan, et al. ,"Efficient sequential correspondence selection by cosegmentation", IEEE TPAMI, 32(9):1568-1581, Sep. 2010.
Cuturi, Marco, "Sinkhorn distances: Lightspeed computation of optimal transport", NIPS, 2013, (9 pages).
Dai, Angela, et al. ,"ScanNet: Richly-annotated 3d reconstructions of indoor scenes", In CVPR, arXiv:1702.04405v2 [cs.CV] Apr. 11, 2017, (22 pages).
Deng, Haowen, et al. ,"PPFnet: Global context aware local features for robust 3d point matching", In CVPR, arXiv:1802.02669v2 [cs.CV] Mar. 1, 2018, (12 pages).
Detone, Daniel, et al. ,"Deep image homography estimation", In RSS Work-shop: Limits and Potentials of Deep Learning in Robotics, arXiv:1606.03798v1 [cs.CV] Jun. 13, 2016, (6 pages).
Detone, Daniel, et al. ,"Self-improving visual odometry", arXiv:1812.03245, Dec. 8, 2018, (9 pages).
Detone, Daniel, et al. ,"SuperPoint: Self-supervised interest point detection and description", In CVPR Workshop on Deep Learning for Visual SLAM, arXiv:1712.07629v4 [cs.CV] Apr. 19, 2018, (13 pages).
Dusmanu, Mihai, et al. ,"D2-net: A trainable CNN for joint detection and description of local features", CVPR, arXiv:1905.03561v1 [cs.CV] May 9, 2019, (16 pages).

(56) References Cited

OTHER PUBLICATIONS

Ebel, Patrick, et al., "Beyond cartesian representations for local descriptors", ICCV, arXiv:1908.05547v1 [cs.CV] Aug. 15, 2019, (11 pages).

Fischler, Martin A, et al., "Random sample consensus: a paradigm for model fitting with applications to image analysis and automated cartography", Communications of the ACM, 24(6): 1981, pp. 381-395.

Gilmer, Justin, et al., "Neural message passing for quantum chemistry", In ICML, arXiv:1704.01212v2 [cs.LG] Jun. 12, 2017, (14 pages).

Giuseppe, Donato, et al., "Stereoscopic helmet mounted system for real time 3D environment reconstruction and indoor ego—motion estimation", Proc. SPIE 6955, Head- and Helmet-Mounted Displays XIII: Design and Applications, 69550P.

Goodfellow, "Titanium Dioxide—Titania (TiO2)", AZO Materials; Publication [online]. Jan. 11, 2002 [retrieved Feb. 19, 2020]. Retrieved from the Internet: <URL: https://www.azom.com/article.aspx?ArticleID=1179>.

Hartley, Richard, et al., "Multiple View Geometry in Computer Vision", Cambridge University Press, 2003, pp. 1-673.

Jacob, Robert J.K., "Eye Tracking in Advanced Interface Design", Human-Computer Interaction Lab, Naval Research Laboratory, Washington, D.C., date unknown. 2003, pp. 1-50.

Lee, et al., "Self-Attention Graph Pooling", Cornell University Library/Computer Science/Machine Learning, Apr. 17, 2019 [retrieved on Jan. 8, 2021 from the Internet< URL: https://arxiv.org/abs/1904.08082 >, entire document.

Lee, Juho, et al., "Set transformer: A frame-work for attention-based permutation-invariant neural networks", ICML, arXiv:1810.00825v3 [cs.LG] May 26, 2019, (17 pages).

Leordeanu, Marius, et al., "A spectral technique for correspondence problems using pairwise constraints", Proceedings of (ICCV) International Conference on Computer Vision, vol. 2, pp. 1482-1489, Oct. 2005, (8 pages).

Levola, T., "Diffractive Optics for Virtual Reality Displays", Journal of the SID Eurodisplay 14/05, 2005, XP008093627, chapters 2-3, Figures 2 and 10, pp. 467-475.

Levola, Tapani, "Invited Paper: Novel Diffractive Optical Components for Near to Eye Displays—Nokia Research Center", SID 2006 DIGEST, 2006 SID International Symposium, Society for Information Display, vol. XXXVII, May 24, 2005, chapters 1-3, figures 1 and 3, pp. 64-67.

Li, Yujia, et al., "Graph matching networks for learning the similarity of graph structured objects", ICML, arXiv:1904.12787v2 [cs.LG] May 12, 2019, (18 pages).

Li, Zhengqi, et al., "Megadepth: Learning single-view depth prediction from internet photos", In CVPR, fromarXiv: 1804.00607v4 [cs.CV] Nov. 28, 2018, (10 pages).

Libovicky, et al., "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document.

Loiola, Eliane Maria, et al., "A survey for the quadratic assignment problem", European journal of operational research, 176(2): 2007, pp. 657-690.

Lowe, David G, "Distinctive image features from scale-invariant keypoints", International Journal of Computer Vision, 60(2): 91-110, 2004, (28 pages).

Luo, Zixin, et al., "ContextDesc: Local descriptor augmentation with cross-modality context", CVPR, arXiv:1904.04084v1 [cs.CV] Apr. 8, 2019, (14 pages).

Memon, F., et al., "Synthesis, Characterization and Optical Constants of Silicon Oxycarbide", EPJ Web of Conferences; Publication [online]. Mar. 23, 2017 [retrieved Feb. 19, 2020].<URL: https://www.epj-conferences.org/articles/epjconf/pdf/2017/08/epjconf_nanop2017_00002.pdf>; DOI: 10.1051/epjconf/201713900002, (8 pages).

Molchanov, Pavlo, et al., "Short-range FMCW monopulse radar for hand-gesture sensing", 2015 IEEE Radar Conference (RadarCon) (2015), pp. 1491-1496.

Mrad, et al., "A framework for System Level Low Power Design Space Exploration", , (5 pagea).

Munkres, James, "Algorithms for the assignment and transportation problems", Journal of the Society for Industrial and Applied Mathematics, 5(1): 1957, pp. 32-38.

Ono, Yuki, et al., "LF-Net: Learning local features from images", 32nd Conference on Neural Information Processing Systems (NIPS 2018), arXiv:1805.09662v2 [cs.CV] Nov. 22, 2018, (13 pages).

Paszke, Adam, et al., "Automatic differentiation in Pytorch", 31st Conference on Neural Information Processing Systems (NIPS 2017), Long Beach, CA, USA, (4 pages).

Peyré, Gabriel, et al., "Computational Optimal Transport", Foundations and Trends in Machine Learning, 11(5-6):355-607, 2019; arXiv:1803.00567v4 [stat.ML] Mar. 18, 2020, (209 pages).

Qi, Charles Ruizhongtai, et al., "Pointnet++: Deep hierarchical feature learning on point sets in a metric space.", 31st Conference on Neural Information Processing Systems (NIPS 2017), Long Beach, CA, USA., (10 pages).

Qi, Charles R, et al., "Pointnet: Deep Learning on Point Sets for 3D Classification and Segmentation", CVPR, arXiv:1612.00593v2 [cs.CV] Apr. 2, 1001, (19 pages).

Radenović, Filip, et al., "Revisiting Oxford and Paris: Large-Scale Image Retrieval Benchmarking", CVPR, arXiv:1803.11285v1 [cs.CV] Mar. 29, 2018, (10 pages).

Raguram, Rahul, et al., "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).

Ranftl, René, et al., "Deep fundamental matrix estimation", European Conference on Computer Vision (ECCV), 2018, (17 pages).

Revaud, Jerome, et al., "R2D2: Repeatable and Reliable Detector and Descriptor", In NeurIPS, arXiv:1906.06195v2 [cs.CV] Jun. 17, 2019, (12 pages).

Rocco, Ignacio, et al., "Neighbourhood Consensus Networks", 32nd Conference on Neural Information Processing Systems (NeurIPS 2018), Montréal, Canada, arXiv:1810.10510v2 [cs.CV] Nov. 29, 2018, (20 pages).

Rublee, Ethan, et al., "ORB: An efficient alternative to SIFT or SURF", Proceedings of the IEEE International Conference on Computer Vision. 2564-2571. 2011; 10.1109/ICCV.2011.612654, (9 pages).

Sarlin, et al., "SuperGlue: Learning Feature Matching with Graph Neural Networks", Cornell University Library/Computer Science/Computer Vision and Pattern Recognition, Nov. 26, 2019 [retrieved on Jan. 8, 2021 from the Internet< URL: https://arxiv.org/abs/1911.11763 >, entire document.

Sattler, Torsten, et al., "SCRAMSAC: Improving RANSAC's efficiency with a spatial consistency filter", ICCV, 2009: 2090-2097., (8 pages).

Schonberger, Johannes Lutz, et al., "Pixelwise view selection for un-structured multi-view stereo", Computer Vision—ECCV 2016: 14th European Conference, Amsterdam, The Netherlands, Oct. 11-14, 2016, Proceedings, Part III, pp. 501-518, 2016.

Schonberger, Johannes Lutz, et al., "Structure-from-motion revisited", Proceedings of the IEEE Conference on Computer Vision and Pattern Recognition (CVPR), 2016, pp. 4104-4113, (11 pages).

Sheng, Liu, et al., "Time-multiplexed dual-focal plane head-mounted display with a liquid lens", Optics Letters, Optical Society of Amer i ca, US, vol. 34, No. 11, Jun. 1, 2009 (Jun. 1, 2009), XP001524475, ISSN: 0146-9592, pp. 1642-1644.

Sinkhorn, Richard, et al., "Concerning nonnegative matrices and doubly stochastic matrices.", Pacific Journal of Mathematics, 1967, pp. 343-348.

Spencer, T., et al., "Decomposition of poly(propylene carbonate) with UV sensitive iodonium 11 salts", Polymer Degradation and Stability; [online]. Dec. 24, 2010 (retrieved Feb. 19, 2020]., (17 pages).

(56) References Cited

OTHER PUBLICATIONS

Tanriverdi, Vildan, et al., "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
Thomee, Bart, et al., "YFCC100m: The new data in multimedia research", Communications of the ACM, 59(2):64-73, 2016; arXiv:1503.01817v2 [cs.MM] Apr. 25, 2016, (8 pages).
Torresani, Lorenzo, et al., "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne, et al., "Wide baseline stereo matching based on local, affinely invariant regions", BMVC, 2000, pp. 1-14.
Ulyanov, Dmitry, et al., "Instance normalization: The missing ingredient for fast stylization", arXiv:1607.08022v3 [cs.CV] Nov. 6, 2017, (6 pages).
Vaswani, Ashish, et al., "Attention is all you need", 31st Conference on Neural Information Processing Systems (NIPS 2017), Long Beach, CA, USA; arXiv:1706.03762v5 [cs.CL] Dec. 6, 2017, (15 pages).
Veličković, Petar, et al., "Graph attention networks", ICLR, arXiv:1710.10903v3 [stat.ML] Feb. 4, 2018, (12 pages).
Villani, Cédric, "Optimal transport: old and new", vol. 338. Springer Science & Business Media, Jun. 2008, pp. 1-998.
Wang, Xiaolong, et al., "Non-local neural networks", CVPR, arXiv:1711.07971v3 [cs.CV] Apr. 13, 2018, (10 pages).
Wang, Yue, et al., "Deep Closest Point: Learning representations for point cloud registration", ICCV, arXiv:1905.03304v1 [cs.CV] May 8, 2019, (10 pages).
Wang, Yue, et al., "Dynamic Graph CNN for learning on point clouds", ACM Transactions on Graphics, arXiv:1801.07829v2 [cs.CV] Jun. 11, 2019, (13 pages).
Weissel, et al., "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>.
Yi, Kwang Moo, et al., "Learning to find good correspondences", CVPR, arXiv:1711.05971v2 [cs.CV] May 21, 2018, (13 pages).
Yi, Kwang Moo, et al., "Lift: Learned invariant feature transform", ECCV, arXiv:1603.09114v2 [cs.CV] Jul. 29, 2016, (16 pages).
Zaheer, Manzil, et al., "Deep Sets", 31st Conference on Neural Information Processing Systems (NIPS 2017), Long Beach, CA, USA; arXiv:1703.06114v3 [cs.LG] Apr. 14, 2018, (29 pages).
Zhang, Jiahui, et al., "Learning two-view correspondences and geometry using order-aware network", ICCV; aarXiv:1908.04964v1 [cs.CV] Aug. 14, 2019, (11 pages).
Zhang, Li, et al., "Dual graph convolutional net-work for semantic segmentation", BMVC, 2019; arXiv:1909.06121v3 [cs.CV] Aug. 26, 2020, (18 pages).
"Extended European Search Report dated Dec. 14, 2022", European Patent Application No. 20886547.7, (8 pages).
"Extended European Search Report dated Aug. 24, 2022", European Patent Application No. 20846338.0, (13 pages).
"Extended European Search Report dated Aug. 8, 2022", European Patent Application No. 19898874.3, (8 pages).
"Extended European Search Report dated Sep. 8, 2022", European Patent Application No. 20798769.4, (13 pages).
"Extended European Search Report dated Nov. 3, 2022", European Patent Application No. 20770244.0, (23 pages).
"Final Office Action dated Dec. 29, 2022", U.S. Appl. No. 17/098,059, (32 pages).
"First Examination Report dated Jul. 27, 2022", Chinese Patent Application No. 201980036675.2, (5 pages).
"First Examination Report dated Jul. 28, 2022", Indian Patent Application No. 202047024232, (6 pages).
"First Office Action dated Sep. 16, 2022 with English translation", Chinese Patent Application No. 201980063642.7, (7 pages).
"FS_XR5G: Permanent document, v0.4.0", Qualcomm Incorporated, 3GPP TSG-SA 4 Meeting 103 retrieved from the Internet: URL:http://www.3gpp.org/ftp/Meetings%5F3GP P%5FSYNC/SA4/Docs/S4%2DI90526%2Ezip [retrieved on Apr. 12, 2019], Apr. 12, 2019, (98 pages).
"Non Final Office Action dated Dec. 7, 2022", U.S. Appl. No. 17/357,795, (63 pages).
"Non Final Office Action dated Jul. 26, 2022", U.S. Appl. No. 17/098,059, (28 pages).
"Non Final Office Action dated Sep. 19, 2022", U.S. Appl. No. 17/263,001, (14 pages).
"Notice of Reason for Rejection dated Oct. 28, 2022 with English translation", Japanese Patent Application No. 2020-531452, (3 pages).
"Office Action dated Nov. 24, 2022 with English Translation", Japanese Patent Application No. 2020-533730, (11 pages).
"Second Office Action dated Jul. 13, 2022 with English Translation", Chinese Patent Application No. 201880079474.6, (10 pages).
"Second Office Action dated Jun. 20, 2022 with English Translation", Chinese Patent Application No. 201880089255.6, (14 pages).
Anonymous, "Koi Pond: Top iPhone App Store Paid App", https://web.archive.org/web/20080904061233/https://www.iphoneincanada.ca/reviews /koi-pond-top-iphone-app-store-paid-app/—[retrieved on Aug. 9, 2022], (2 pages).
Chittineni, C., et al., "Single filters for combined image geometric manipulation and enhancement", Proceedings of SPIE vol. 1903, Image and Video Processing, Apr. 8, 1993, San Jose, CA. (Year. 1993), pp. 111-121.
"Communication according to Rule 164(1) EPC dated Feb. 23, 2022", European Patent Application No. 20753144.3, (11 pages).
"Communication Pursuant to Article 94(3) EPC dated Apr. 25, 2022", European Patent Application No. 18885707.2, (5 pages).
"Communication Pursuant to Article 94(3) EPC dated May 30, 2022", European Patent Application No. 19768418.6, (6 pages).
"Extended European Search Report dated Jan. 28, 2022", European Patent Application No. 19815876.8, (9 pages).
"Extended European Search Report dated Jan. 4, 2022", European Patent Application No. 19815085.6, (9 pages).
"Extended European Search Report dated Jun. 19, 2020", European Patent Application No. 20154750.2, (10 pages).
"Extended European Search Report dated Mar. 22, 2022", European Patent Application No. 19843487.0, (14 pages).
"Extended European Search Report dated May 16, 2022", European Patent Application No. 19871001.4, (9 pages).
"Extended European Search Report dated May 30, 2022", European Patent Application No. 20753144.3, (10 pages).
"Final Office Action dated Feb. 23, 2022", U.S. Appl. No. 16/748,193, (23 pages).
"Final Office Action dated Feb. 3, 2022", U.S. Appl. No. 16/864,721, (36 pages).
"Final Office Action dated Jul. 13, 2022", U.S. Appl. No. 17/262,991, (18 pages).
"First Examination Report dated May 13, 2022", Indian Patent Application No. 202047026359, (8 pages).
"First Office Action dated Mar. 14, 2022 with English translation", Chinese Patent Application No. 201880079474.6, (11 pages).
"Non Final Office Action dated Apr. 1, 2022", U.S. Appl. No. 17/256,961, (65 pages).
"Non Final Office Action dated Apr. 11, 2022", U.S. Appl. No. 16/938,782, (52 pages).
"Non Final Office Action dated Apr. 12, 2022", U.S. Appl. No. 17/262,991, (60 pages).
"Non Final Office Action dated Feb. 2, 2022", U.S. Appl. No. 16/783,866, (8 pages).
"Non Final Office Action dated Mar. 31, 2022", U.S. Appl. No. 17/257,814, (60 pages).
"Non Final Office Action dated Mar. 9, 2022", U.S. Appl. No. 16/870,676, (57 pages).
"Non Final Office Action dated May 10, 2022", U.S. Appl. No. 17/140,921, (25 pages).

(56) References Cited

OTHER PUBLICATIONS

"Non Final Office Action dated May 17, 2022", U.S. Appl. No. 16/748,193, (11 pages).
"Decision of Rejection dated Jan. 5, 2023 with English translation", Chinese Patent Application No. 201880079474.6, (10 pages).
"Extended European Search Report dated Apr. 5, 2023", European Patent Application No. 20888716.6, (11 pages).
"Final Office Action dated Mar. 10, 2023", U.S. Appl. No. 17/357,795, (15 pages).
"First Office Action dated Apr. 21, 2023 with English translation", Japanese Patent Application No. 2021-509779, (26 bages).
"First Office Action dated Apr. 13, 2023 with English Translation", Japanese Patent Application No. 2020-567766, (7 pages).
"First Office Action dated Dec. 22, 2022 with English translation", Chinese Patent Application No. 201980061450.2, (11 pages).
"First Office Action dated Jan. 24, 2023 with English translation", Japanese Patent Application No. 2020-549034, (7 pages).
"First Office Action dated Jan. 30, 2023 with English translation", Chinese Patent Application No. 201980082951.9, (5 pages).
"First Office Action dated Mar. 27, 2023 with English translation", Japanese Patent Application No. 2020-566617, (6 pages).
"First Office Action dated Mar. 6, 2023 with English translation", Korean Patent Application No. 10-2020-7019685, (7 pages).
"Non Final Office Action dated Apr. 13, 2023", U.S. Appl. No. 17/098,043, (7 pages).
"Non Final Office Action dated Feb. 3, 2023", U.S. Appl. No. 17/429,100, (16 pages).
"Non Final Office Action dated Feb. 3, 2023", U.S. Appl. No. 17/497,965, (32 pages).
"Non Final Office Action dated Jan. 24, 2023", U.S. Appl. No. 17/497,940, (10 pages).
"Non Final Office Action dated Mar. 1, 2023", U.S. Appl. No. 18/046,739, (34 pages).
"Non Final Office Action dated May 11, 2023", U.S. Appl. No. 17/822,279, (24 pages).
"Office Action dated Apr. 13, 2023 with English translation", Japanese Patent Application No. 2020-533730, (13 pages).
"Office Action dated Mar. 30, 2023 with English translation", Japanese Patent Application No. 2020-566620, (10 pages).
Li, Yujia, et al., "Graph Matching Networks for Learning the Similarity of Graph Structured Objects", arxiv.org, Cornell University Library, 201 OLIN Library Cornell University Ithaca, NY 14853, XP081268608, Apr. 29, 2019.
Luo, Zixin, et al., "ContextDesc: Local Descriptor Augmentation With Cross-Modality Context", 2019 IEEE/CVF Conference on Computer Vision and Pattern Recognition (CVPR), IEEE, XP033686823, DOI: 10.1109/CVPR.2019.00263 [retrieved on Jan. 8, 2020], Jun. 15, 2019, pp. 2522-2531.
Zhang, Zen, et al., "Deep Graphical Feature Learning for the Feature Matching Problem", 2019 IEEE/CVF International Conference on Computer Vision (ICCV), IEEE, XP033723985, DOI: 10.1109/ICCV.2019.00519 [retrieved on Feb. 24, 2020], Oct. 27, 2019, pp. 5086-5095.
"Communication Pursuant to Article 94(3) EPC dated Feb. 28, 2023", European Patent Application No. 19845418.3, (6 Pages).
"Communication Pursuant to Article 94(3) EPC dated May 23, 2023", European Patent Application No. 18890390.0, (5 pages).
"Communication Pursuant to Rule 164(1) EPC dated Feb. 23, 2022", European Patent Application No. 20753144.3, (11 pages).

"First Examination Report dated Aug. 8, 2023", Australian Patent Application No. 2018379105, (3 pages).
"First Office Action dated Jul. 4, 2023 with English translation", Japanese Patent Application No. 2021-505669, (6 pages).
"First Office Action dated Jun. 13, 2023 with English translation", Japanese Patent Application No. 2020-567853, (7 pages).
"First Office Action dated May 26, 2023 with English translation", Japanese Patent Application No. 2021-500607, (6 pages).
"First Office Action dated May 30, 2023 with English translation", Japanese Patent Application No. 2021-519873, (8 pages).
"Non Final Office Action dated Aug. 2, 2023", U.S. Appl. No. 17/807,600, (25 pages).
"Non Final Office Action dated Jul. 20, 2023", U.S. Appl. No. 17/650,188, (11 pages).
"Non Final Office Action dated Jun. 14, 2023", U.S. Appl. No. 17/516,483, (10 pages).
"Notice of Allowance dated Jul. 27, 2023 with English translation", Korean Patent Application No. 10-2020-7019685, (4 pages).
"Office Action dated Jul. 20, 2023 with English translation", Japanese Patent Application No. 2021-505884, (6 pages).
"Office Action dated Jun. 8, 2023 with English translation", Japanese Patent Application No. 2021-503762, (6 pages).
"Second Office Action dated May 2, 2023 with English Translation", Japanese Patent Application No. 2020-549034, (6 pages).
"Communication Pursuant to Article 94(3) EPC dated Jul. 28, 2023", European Patent Application No. 19843487.0, (15 pages).
"Final Office Action dated Sep. 8, 2023 with English translation", Japanese Patent Application No. 2020-566620, (18 pages).
"Wikipedia Dioptre", Jun. 22, 2018 (Jun. 22, 2018), XP093066995, Retrieved from the Internet: URL:https://en.wikipedia.org/w/index.php?title=Dioptre&direction=next&oldid=846451540 [retrieved on Jul. 25, 2023], (3 pages).
"First Office Action dated Sep. 29, 2023 with English translation", Japanese Patent Application No. 2023-10887, (5 pages).
"Non Final Office Action dated Oct. 24, 2023", U.S. Appl. No. 17/259,020, (21 pages).
First Office Action dated Dec. 11, 2023, Chinese Patent Application No. 201980032005.3, (10 pages).
"Extended European Search Report dated Jan. 8, 2024", European Patent Application No. 23195266.4, (8 pages).
"Final Office Action dated Dec. 1, 2023", U.S. Appl. No. 17/357,795, (18 pages).
"First Office Action dated Dec. 12, 2023 with English translation", Japanese Patent Application No. 2021-545712, (8 pages).
"First Office Action dated Nov. 2, 2023 with English translation", Chinese Patent Application No. 201980090867.1, (16 pages).
"Non Final Office Action dated Nov. 22, 2023", U.S. Appl. No. 17/268,376, (8 pages).
"Non Final Office Action dated Nov. 3, 2023", U.S. Appl. No. 17/416,248, (17 pages).
"Office Action dated Nov. 21, 2023 with English Translation", Japanese Patent Application No. 2021-535716, (15 pages).
"Office Action dated Dec. 14, 2023 with English translation", Japanese Patent Application No. 2021-526564, (13 pages).
"Office Action dated Nov. 7, 2023 with English translation", Korean Patent Application No. 10-2023-7036734, (5 pages).
"Office Action dated Nov. 8, 2023 with English translation", Chinese Patent Application No. 201980060018.1, (12 pages).

\* cited by examiner

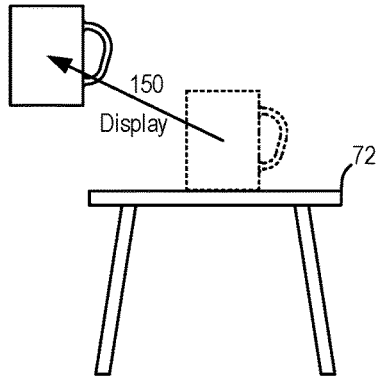

Movement of object within vision of user

FIG. 7A

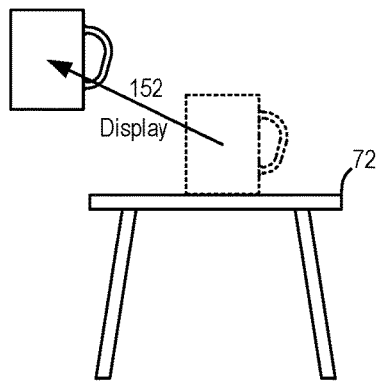

Movement of gaze angle within view of eye tracking camera due to display deformation with no camera deformation

FIG. 7B

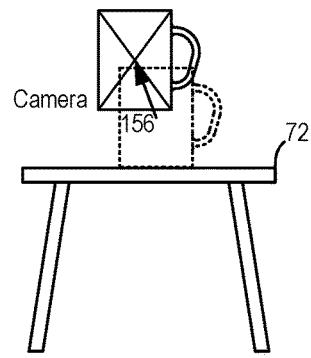

Movement of gaze angle within view of eye tracking camera due to camera deformation

FIG. 7C

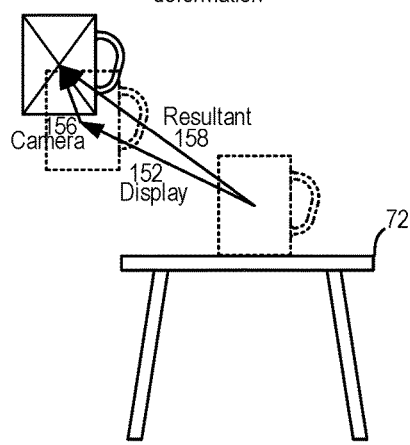

Resultant movement of gaze angle within view of eye tracking camera due to display deformation and camera deformation

FIG. 7D

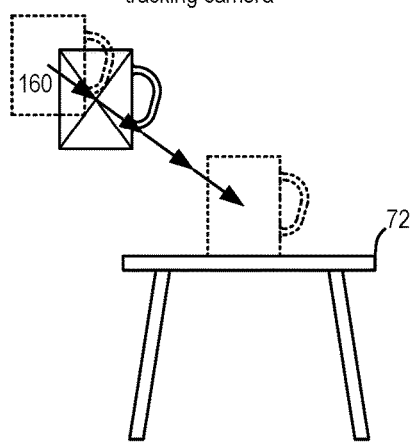

Move object incrementally within vision of user - gaze angle moves within view of eye tracking camera

FIG. 7E

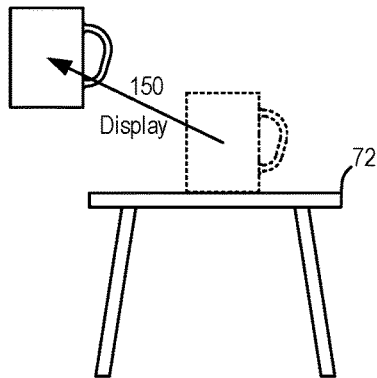

Movement of object within vision of user

FIG. 8A

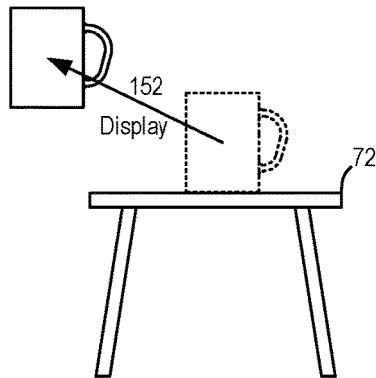

Movement of gaze angle within view of eye tracking camera due to display deformation with no camera deformation

FIG. 8B

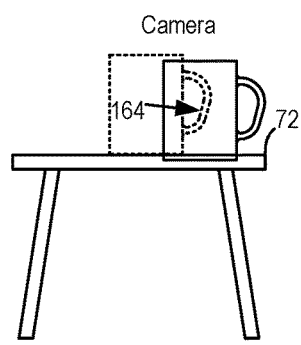

Movement of gaze angle within view of eye tracking camera due to camera deformation

FIG. 8C

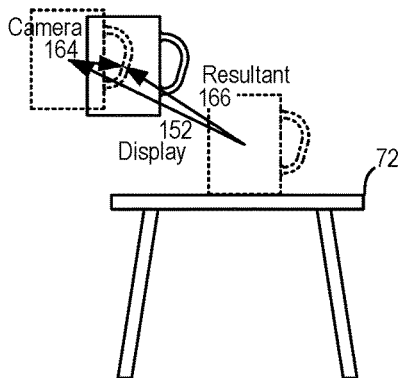

Resultant movement of gaze angle within view of eye tracking camera due to display deformation and camera deformation

FIG. 8D

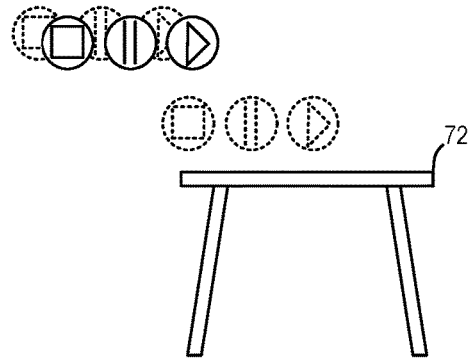

Solution 1:
Do nothing – object is in an acceptable location for the user

FIG. 9

Solution 2:
Calculate gaze angle change
due to deformation of camera
from out-of-box
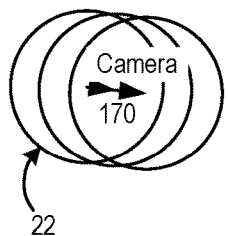
Calculate movement of object
within vision of user
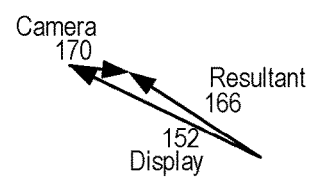
Move object incrementally
within vision of user - gaze
angle moves within view of eye
tracking camera
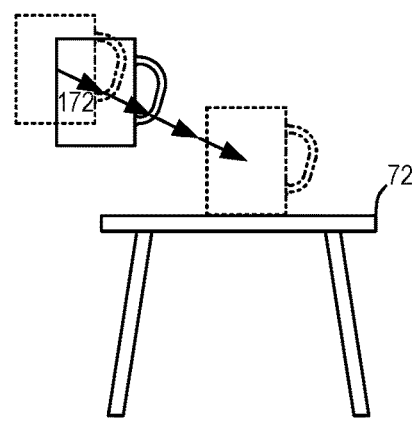
FIG. 10A
FIG. 10B
FIG. 10C

IMAGE CORRECTION DUE TO DEFORMATION OF COMPONENTS OF A VIEWING DEVICE

CROSS-REFERENCE TO RELATED APPLICATIONS

This application is a continuation of U.S. patent application Ser. No. 16/928,313, filed on Jul. 14, 2020, which is a continuation of U.S. patent application Ser. No. 16/355,611, filed on Mar. 15, 2019, now U.S. Pat. No. 10,755,676, which claims priority from U.S. Provisional Patent Application No. 62/643,672, filed on Mar. 15, 2018, all of which are incorporated herein by reference in their entirety.

BACKGROUND OF THE INVENTION

1). Field of the Invention

This invention relates generally to a viewing device and to a method of displaying rendered content, and more specifically to detecting and correcting for deformation of components of the view device.

2). Discussion of Related Art

Viewing devices that provide a rendered image have become popular for computing, entertainment and other purposes. A viewing device is usually a wearable device with a display for rendering the image and may include various features such as the ability to have the user see a three-dimensional image, to have the user see a rendering within a real world environment with or without fixing its location within the real world environment, and displaying video or other moving renderings to the user.

A viewing device has various components that deform over time due to its use. When these components deform, a virtual object that is rendered may not be in its original location when the viewing device was still new. For example, a background application may display a virtual object in a fixed location relative to the viewing device or in a fixed location relative to real world objects surrounding the user. In some instances, the viewing device may have a see-through display so that the user can see the real world objects and the perceive the rendered objects in a fixed location relative to the real world objects. The user may, for example, perceive a rendered coffee mug on a real world table. When the components of the viewing device deform, the coffee mug may not be rendered on the table anymore, but instead float at some distance above the table. The coffee mug is thus not displayed to the user in a manner that is true to reality. In addition, if the coffee mug is used as an interface element for the user to interact with the background application, there may be a mismatch between where the background application expects the coffee mug to be and where the user interacts with the coffee mug.

SUMMARY OF THE INVENTION

The invention provides a viewing device for displaying rendered content including a display assembly configured to display a virtual object in a select location on the display assembly, wherein an eye viewing the virtual object has an expected gaze direction; and a deformation detection system connected to the display assembly and configured to detect a measured gaze direction of the eye viewing the virtual object on the display assembly and calculate a deformation of the display assembly based on the measured gaze direction being an altered gaze direction that is different from the expected gaze direction.

The invention also provides a method of displaying rendered content including displaying, with a display assembly, a virtual object in a select location on the display assembly wherein an eye viewing the virtual object has an expected gaze direction and detecting a deformation of the display assembly, wherein the deformation causes the virtual object to be viewable in an altered location wherein the eye has an altered gaze direction.

BRIEF DESCRIPTION OF THE DRAWINGS

The invention is further described by way of examples wherein:

FIGS. 7A to 7E illustrate movement of the virtual object due to display deformation with a corresponding change in gaze angle (FIGS. 7A to 7B), the effect of deformation of an eye tracking camera on a calculated gaze angle (FIGS. 7C and 7D), and correction of the gaze angle (FIG. 7E);

FIGS. 8A to 8D illustrate movement of a virtual object and a corresponding change in gaze vector (FIGS. 8A and 8B), and the effect of deformation of an eye tracking camera on a calculated gaze angle (FIGS. 8C and 8D);

FIG. 9 illustrates one solution to rectify a resultant change in gaze angle as represented in FIG. 8D;

FIGS. 10A to 10C illustrate a different solution than FIG. 9 to rectify the resultant gaze angle in FIG. 8D;

DETAILED DESCRIPTION OF THE INVENTION

Figure 1:
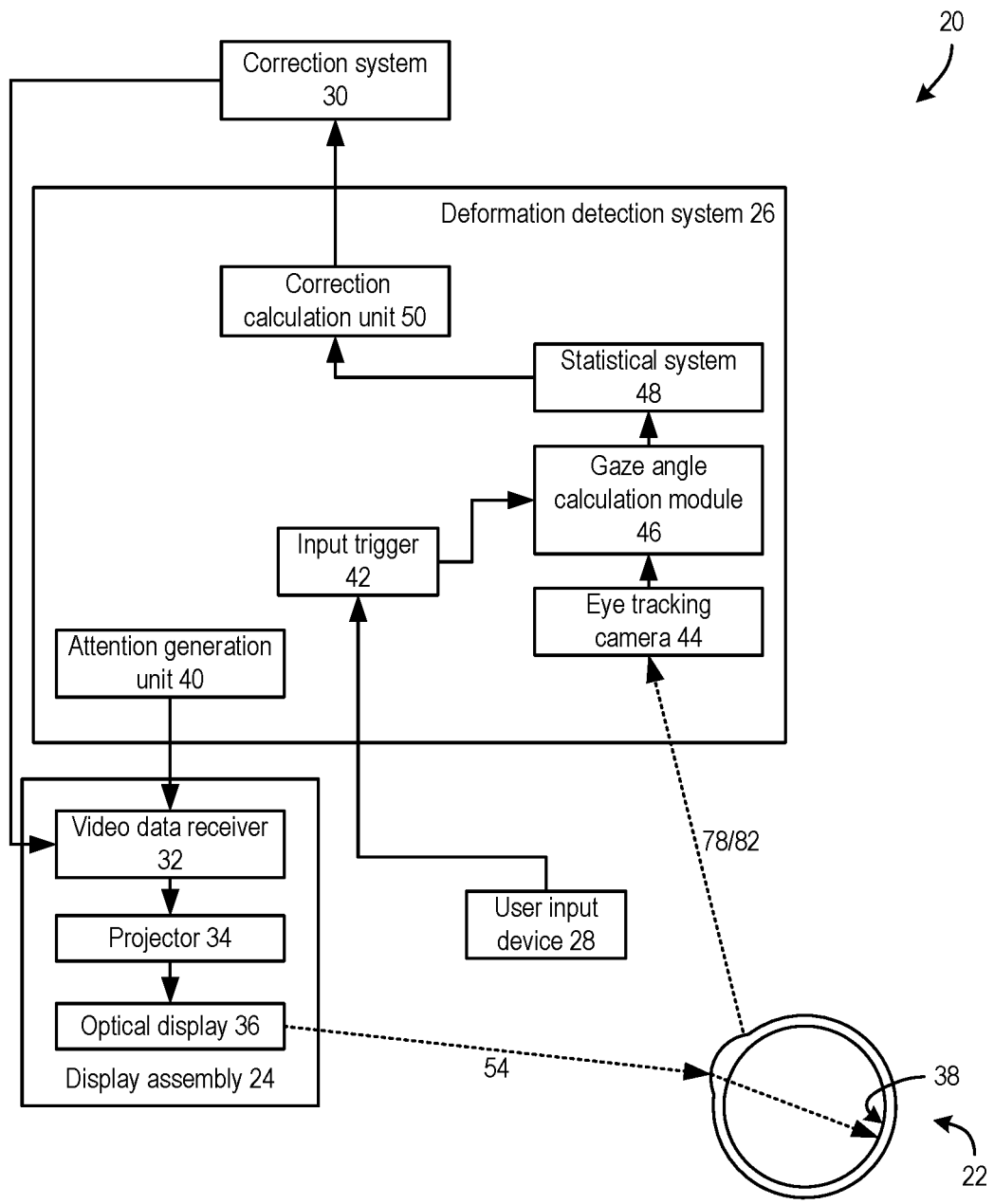
FIG. 1 is a block diagram showing a viewing device, according to an embodiment of the invention that displays rendered content to an eye of a user.

FIG. 1 of the accompanying drawings illustrates a viewing device 20, according to an embodiment of the invention that is used to display rendered content to an eye 22 of a user. The viewing device 20 includes a display assembly 24, a deformation detection system 26, a user input device 28 and a correction system 30.

The display assembly 24 includes a video data receiver 32, a projector 34 and an optical display 36 connected directly or indirectly to one another. The display assembly 24 includes a structure (not shown) that is securable to a head of a user with the optical display 36 in front of the eye 22 of the user. The optical display 36 is a transparent component that allows the eye 22 to see objects in the real world behind the optical display 36 and can simultaneously project virtual images to the user such that light associated with real and virtual objects is visible to the user.

The video data receiver 32 is connected or connectable to a video data channel which carries color and intensity values of pixels. The projector 34 has a laser and a scanner that are capable of creating a two-dimensional pattern based on the video data. The optical display 36 is located in a position for the laser of the projector 34 to couple laser light into the optical display 36. The laser light then propagates through the optical display 36 and exits the optical display 36 through a pupil of the optical display 36 towards the eye 22. The eye 22 thus receives light from the real world objects behind the optical display 36 and light that is generated by the projector 34. An augmented reality view is then created on a retina 38 of the eye 22, the augmented reality view including light from the real world scene visible to the user through the optical display 36 combined with light created by the projector 34 that represents virtual content.

The deformation detection system 26 includes an attention generation unit 40, an input trigger 42, an eye tracking camera 44, a gaze angle calculation module 46, a statistical system 48, and a correction calculation unit 50.

The attention generation unit 40 is connected to the video data receiver 32. The attention generation unit 40 is configured to provide an override functionality to the video data receiver 32. The attention generation unit 40 may for example insert a virtual object within the data stream received by the video data receiver 32, change the color of a virtual object and/or reduce the size of a virtual object for the purpose of having the eye 22 direct its gaze angle towards the virtual object and focus on the virtual object. While an attention generation unit 40 is described, virtual content that can be used as a basis for calibrating an augmented reality system may generally be provided by a rendering system or module.

The input trigger 42 is connected to the user input device 28 and detects a user input through the user input device 28. The user input device 28 may for example be one or more of a joy stick, a wand, a camera that tracks a body part of the user, a button, a touchpad, a sensor-equipped glove, a mouse, a keyboard, etc. The user input device 28 provides an input to the input trigger 42.

The eye tracking camera 44 is mounted to the display assembly 24 in a position to capture an image of the eye 22. In some embodiments, one or more camera per eye is used to image a user's eyes. Alternatively, a single camera having a sufficiently wide angle to capture an image including both of the user's eyes may be used.

The gaze angle calculation module 46 is connected to the eye tracking camera 44 and the input trigger 42. The gaze angle calculation module 46 calculates a gaze angle of the eye 22 based on an image captured by the eye tracking camera 44. The gaze angle calculation module 46 is connected to the input trigger 42 and is activated by the input trigger 42 such that a gaze angle is calculated by the gaze angle calculation module 46 when a user input is detected. While the system is described using a calculated gaze angle, any other eye gaze orientation characteristic may also be used such as, for example, a gaze vector, a gaze coordinate, a visual axis orientation, or a cornea center location. Additionally, gaze data from the left and right eyes may be used in combination to gather information about the location on which a user's eyes are focused.

The statistical system 48 is connected to the gaze angle calculation module 46 and receives a large number of gaze angle calculation measurements. The statistical system 48 records a gaze angle received from the gaze angle calculation module 46 each time that the input trigger 42 activates the gaze angle calculation module 46. The statistical system 48 thus collects a number of gaze angles over a period of time. The statistical system 48 then calculates a statistically relevant gaze angle, for example a median gaze angle from the gaze angles that are recorded by the statistical system 48. A representative gaze angle may be selected or calculated and may be used in a comparison to an expected gaze angle associated with the displaying of virtual content. If the representative gaze angle is substantially different from the expected gaze angle, deformation within the system is concluded to have occurred.

The correction calculation unit 50 is connected to the statistical system 48. The correction calculation unit 50 calculates a desired correction in the location of the rendered virtual object that is created or modified by the attention generation unit 40.

The correction system 30 is connected to the correction calculation unit 50. The correction system 30 receives correction data from the correction calculation unit 50. The video data receiver 32 is connected to the correction system 30. The correction system 30 modifies the location of the virtual object that is created or modified by the attention generation unit 40. The correction system 30 also modifies the locations of all other objects in the video stream by the same amount and direction that the location of the virtual object generated and modified by the attention generation unit 40 is corrected.

In use, the user attaches the viewing device 20 to their head with the optical display 36 in front of the eye 22. The user can then see real world objects through the transmissive optical display 36 and can simultaneously view rendered virtual content.

The video data receiver 32 receives video data from a background application. The background application may for example be a movie application for displaying a movie, a game, a web browser, a menu, a launcher, two-dimensional content, three-dimensional content or any other type of virtual content. The video data includes data representing frames of images that are received at video data rates. The video data includes pixels with intensity and color values. The video data receiver 32 provides the video data to the projector 34. The projector 34 creates a two-dimensional pattern for each frame. The pattern may include laser light bundles, with each bundle representing a respective pixel, and its intensity and color being modulated. The projector 34 couples the pattern into the optical display 36 either directly or indirectly through lenses, mirrors, gratings, or the like. The pattern transmits through the optical display 36 and exits the optical display 36 towards the eye 22. The light beam 54 represents light that transmits from the optical display 36 towards the eye 22. It should however be understood that many light beams representing a virtual object are projected from the optical display 36 such that the image received by the retina 38 resembles the pattern created by the projector 34. In some embodiments the virtual object may be perceived by a user as being three-dimensional due to one or more wavefront shaping techniques applied to the light representing the virtual object. A dynamic image can be seen by the user in embodiments where the pattern continuously changes with each frame of data that is provided by the video data receiver 32 to the projector 34.

The video data that is received by the video data receiver 32 includes data representing one or more objects that are to be displayed on the retina 38 of the eye 22. A virtual object that is represented in the data received by the video data receiver 32 may actually be displayed on the optical display 36. However, it is possible that such a virtual object is not visible or easily discernible on a surface of the optical display 36 due to a number of factors including that the optical display 36 is a see-through display and/or that the optical display 36 primarily serves as a waveguide to direct light between the projector 34 and the eye 22. The video data provided by the video data receiver 32 to the projector 34 still includes data representing objects even if the virtual objects may not be visible on the surface of the optical display 36. For purposes of discussion, it will be assumed that a virtual object or objects are visible on a surface of the optical display 36. It should however be understood that objects are shown on a surface of the optical display 36 for ease of illustration. The invention deals primarily with a calibration methodology that is the same whether objects are actually visible or not visible on a surface of the optical display 36.

During normal operation of the viewing device, the attention generation unit 40 does not provide an override functionality to the normal operation of the video data receiver 32. All video data is presented to the user at a video refresh rate without any interference of the deformation detection system 26. The deformation detection system 26 only overrides the normal functionality of the video data receiver 32 a few times per day (e.g., 50 to 100 times per day of continued use) to take measurements while the video data receiver 32 proceeds uninterrupted for the remainder of the time. The user input device 28 and the eye tracking camera 44 are connected to the background application. During normal operation of the video data receiver 32, the user may use the user input device 28 to provide instructions to the background application or to otherwise interact with virtual content rendered on the optical display 36 while the one or more eye tracking cameras 44 continue to monitor the eyes 22. The user may for example use the user input device 28 to interact with a virtual object that is displayed to the user via the optical display 36 while the background application relies on the eye tracking camera 44 to know when the user is looking at the virtual object.

There is very little or no deformation of the display assembly 24 following factory calibration of the viewing device 20. Objects that are displayed using the optical display 36 are in their expected locations relative to a gaze angle of the eye 22. Over time with use of the viewing device 20, components of the viewing device 20 including or connected to the display assembly 24 begin to deform. The deformation may manifest in a deformation of the optical display 36, deformation of hinges and deformation of materials that are used in the structure that mounts the viewing device 20 to the head of the user. The deformation is usually due to a combination of small or large stresses that are placed on the components of the display assembly 24 and the materials of the components of the display assembly 24. Stresses may for example be created when cabling that are connected to the optical display 36 pull on the optical display 36, when a user fits the viewing device 20 to their head or removes it from their head and when the user operates the hinges, springs, or other dynamic components for purposes of unpacking or storing the viewing device 20. The material properties of the components of the display assembly 24 may be subjected to fatigue when stresses are cycled and it is known that plastics materials experience "creep" when subjected to stresses over time. Some materials of the viewing device 20 may also experience thermal loading, and such changes in temperature may contribute to deformation of one or more components. The result of the deformation is that the actual location at which virtual objects appear to the user on a deformed viewing device 20 is not the intended rendering location of those virtual objects. As a result, the actual gaze of the user is different from the gaze that would be expected if the user were to look at the rendered virtual content at its intended rendering location. In addition, deformation is continuous, so it is expected that the rendering location of virtual objects as perceived by the user will continue to move over time relative to the intended rendering location. The display assembly 24 initially displays a virtual object in a select location wherein the eye 22 has an expected gaze direction. The deformation of the display assembly 24 causes the virtual object to be viewable in an altered location wherein the eye 22 has an altered gaze direction.

One or more components of the deformation detection system 26 may be functionally and structurally connected to the display assembly 24 to detect the deformation of the display assembly. The correction system 30 is connected to the deformation detection system 26. The correction system 30 displays, with the display assembly 24, the virtual object in a corrected location. When the virtual object is displayed in the corrected location, the eye 22 viewing the virtual object in the corrected location has a corrected gaze direction that is moved closer to the expected gaze direction than the altered gaze direction. The deformation detection system 26 provides an overriding or augmentation functionality to the normal operation of the viewing device 20 described above. The deformation detection system 26 is intermittently activated, for example 10 to 20 times per hour during continuous operation. In addition, the deformation detection system 26 is only activated for a few seconds, for example three to seven seconds, which is as long as is needed to take measurements and make an adjustment. The viewing device 20 operates normally during the remainder of the time.

The functioning of the deformation detection system 26 is initiated by activating the attention generation unit 40 while the user input device 28 is connected to the input trigger 42 and the eye tracking camera 44 continues to monitor the eye 22. What is primarily required is for the user to interact with a rendered object that is received by the video data receiver 32 from the background application that is small enough to minimize gaze vector error. The attention generation unit 40 may also modify the color of the virtual object or reduce its size to grab the user's attention and help draw the eye 22 to a small point where the virtual object is located. The video data receiver 32 provides data representing the virtual object to the projector 34. The projector 34 then generates light and projects the light representing the virtual object toward the optical display 36 for viewing by the user.

The virtual object that is being placed or modified by the attention generation unit 40 is of the kind that requires that the user interact with the rendered virtual object using the user input device 28. Such a virtual object may for example be a play button, a target, an application launching icon, etc. When the user uses the user input device 28 to interact with the rendered virtual object, the eye 22 of the user is assumed to be looking at that rendered virtual object on the optical display 36. The eye tracking camera 44 captures an image of the eyes 22 and provides the image data to the gaze angle calculation module 46. The user input device 28 activates the input trigger 42, which instructs the gaze angle calculation module 46 to calculate a gaze angle of the eye 22 using the data received from the eye tracking camera 44. The gaze angle that is calculated by the gaze angle calculation module 46 is representative of an actual location of the rendered virtual object on the optical display 36 as perceived by the user.

The gaze angle calculation module 46 provides the gaze angle to the statistical system 48. The statistical system 48 stores the gaze angle. When the deformation detection system 26 is activated a second time, the process is repeated and the statistical system 48 stores a second gaze angle. The process is repeated until the statistical system 48 has stored enough gaze angles to allow the statistical system 48 to calculate a statistically relevant altered gaze angle. The statistical system 48 may for example calculate an average, a mean or a median gaze angle from the collected gaze angles. The statistical system may calculate a statistically relevant gaze angle from all the measurements, although it is preferably that the statistical system only uses gaze angles that are outside a predetermined error range (e.g., 90 arc-minutes) as data points for calculating a statistically relevant gaze angle. Alternatively, in some embodiments, rather than accumulating multiple measurements to calculate a statistically determined gaze angle before performing an incremental correction, each measured gaze angle that is determined to lie outside of a tolerance error of the expected gaze angle may result in an incremental correction to the rendering location of virtual content.

The statistical system 48 provides the altered gaze angle to the correction calculation unit 50. The correction calculation unit 50 determines the amount of correction that is needed in the gaze angle to return the gaze angle from the altered gaze angle back to the expected gaze angle. The correction calculation unit 50 calculates both the direction and the amount of correction that is required and then calculates an actual correction that is only a small fragment of the required correction. The correction calculation unit 50 then provides the actual correction to the correction system 30. The correction system 30 provides the correction to the video data receiver 32. The video data receiver 32 then moves the virtual object generated by the attention generation unit 40 and all other objects in accordance with the direction and magnitude of the actual correction received from the correction system 30.

The statistical system 48 may require a large number of measurements, for example 50 to 100 measurements, before providing an altered gaze angle to the correction calculation unit 50. In addition, any correction that is made is only a small fraction of the actual change in the gaze angle due to the deformation of the display assembly 24. The cumulative correction is thus a slow process. By way of example, only a single correction may be made during continuous operation of eight hours in one day and it may take several days or weeks for the gaze angle to be corrected within tolerance of the expected gaze angle. Alternatively, several small corrections may be made during use of the device. The number of corrections may depend on how many times a user interacts with virtual content that is considered to be reliable for gaze angle calculation and rendering location calibration. Such a slow process allows for recalculation in case that a mistake is made and allows for continued acceleration and deceleration of the deformation of the display assembly 24 with less risk of over shooting the required correction that has to be made given continued deformation of the display assembly 24.

Figure 2A:
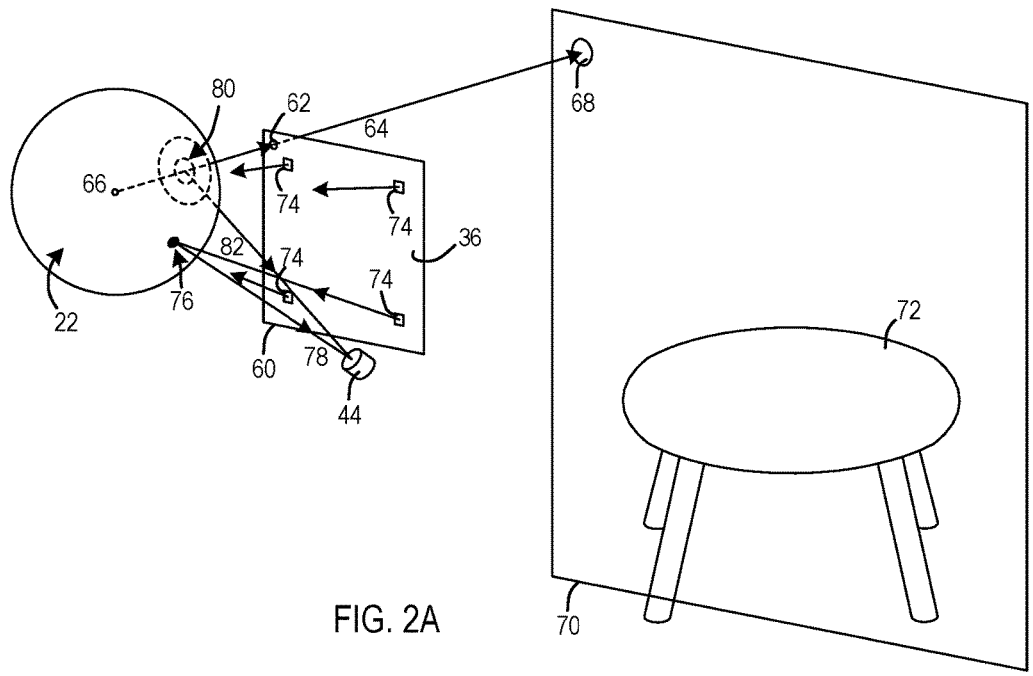
FIG. 2A is a perspective view of an eye and an optical display of the viewing device, wherein the optical display is undeformed.

In FIG. 2A the undeformed shape 60 represents the optical display 36 before deformation. A rendered object 62 is placed in the optical display 36 to attract the attention of the user. When the user looks at the rendered object 62, an actual gaze vector 64 can be defined. The actual gaze vector 64 is a direction or axis along which the eye 22 is directed for purposes of viewing a virtual object. The actual gaze vector extends from a center point 22 of the eye 22 through a center of a pupil of the eye. In order to calculate the actual gaze vector 64, one approach would be to first calculate the actual center point 22 of the eye 22. It may also be possible to calculate the actual gaze vector 64 without calculating the actual center point 22 of the eye 22, but instead to use other anatomical information of the eye for that purpose. The expected gaze vector 64 extends through the optical display 36 and the user perceives the rendered object 62 as an augmented object 68. The augmented object 68 is located in a plane that is represented by an undeformed shape 70. Because the plane of the undeformed shape 70 is farther than a plane of the optical display 36, the user perceives the augmented object 68 to be larger than the rendered object 62 and a field defined by the undeformed shape 70 to be larger than a field defined by the undeformed shape 60. The user also perceives a table 72. The perception that the user has is that of the table 72 augmented with rendered virtual content represented in FIG. 2A by the augmented object 68.

Multiple infrared light emitting diodes (LED's) 74 may be included in the eye tracking system. Each LED 74 transmits infrared light that forms a respective infrared spot (a "glint") 76 on a surface of the eye 22. Reference number 78 represents infrared light that reflects from the spot 76 towards the eye tracking camera 44. The eye tracking camera 44 captures the locations of all of the spots created by the LED's 74 on the surface of the eye 22. The locations of the spots 76 are used by the gaze angle calculation module 46 to calculate the gaze angle or gaze vector of the eye 22. In some embodiments, eye tracking cameras may also capture a location of a pupil. Pupil location data can be used in combination with infrared glints to determine an eye position. A gaze angle or gaze vector may be calculated or otherwise determined based on the eye position information.

The expected gaze vector 64 is shown in FIG. 2A passing through a center of rendered object 62 and augmented object 68. Reference number 82 represents light reflecting from the eye 22 that is captured by the eye tracking camera 44. In some embodiments, the eye tracking camera 44 thus captures an orientation of the eye and the location of the pupil 80. The gaze angle calculation module 46 calculates the actual gaze vector (which in FIG. 2A is coincident to the expected gaze vector 64) using at least the location of the interactable rendered virtual content. In some embodiments, the location of the eye 22 with respect to the optical display 36 may also be used.

It may not always be necessary to take measurement for purposes of determining a pre-deformation gaze angle. For example, when the viewing device 20 is new, it can be assumed that the display assembly 24 is undeformed and that the gaze angle of the eye 22 is as represented by the expected gaze vector 64 when the rendered object 62 is located as shown. The rendered object 62 can thus be located as shown and the expected initial gaze vector 64 can be determined without any additional measurements. The expected and actual gaze angles will change based on location of the rendered content. While an "initial" gaze angle or "pre-deformation" gaze angle could be calculated, an expected gaze vector can be assumed from the background application or from a previous calculation. A difference can then be calculated between the assumed expected gaze angle and actual gaze angle that is newly being calculated.

Figure 2B:
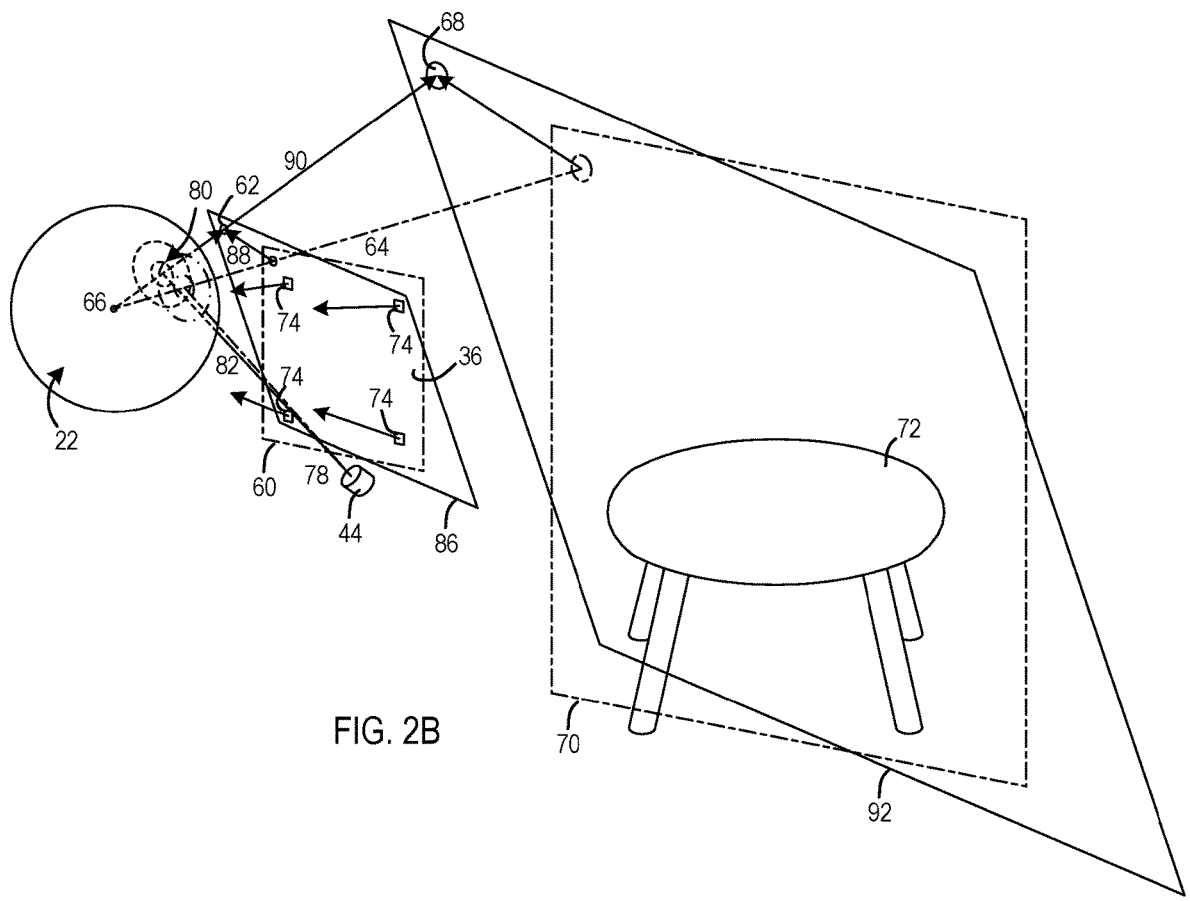
FIG. 2B is a view similar to FIG. 2A wherein the optical display is deformed.

In FIG. 2B, the shape 86 represents deformation of the optical display 36. The deformation of the optical display 36 is represented by the difference in the shape 86 when compared to the undeformed shape 60. The rendered object 62 is still rendered in the same (x, y) location on the display but deformation of the display with respect to the user has the user perceive the content at a location different from the intended location. Due to the deformation, the rendered object 62 is no longer in the location shown in FIG. 2A, but it has moved by a distance and a direction as represented by the vector 88. The rendered object 62 has thus moved in a direction that is a result of the deformation of the optical display 36 in the area of the rendered object 62. An altered gaze vector 90 is defined between the eye 22 and the rendered object 62. The user views the rendered object 62 as an augmented object 68 within a plane as represented by the shape 92. The shape 92 is deformed relative to the undeformed shape 70 in a manner similar to the deformation between the shape 86 and the undeformed shape 60.

When the user looks at the augmented object 68, the actual gaze vector 90 passes from the eye 22 to the location of the augmented object 68 in the deformed shape 92. In this example, the actual gaze vector 90 is different from the expected gaze vector 64. The eye tracking camera 44 continues to capture eye location information, which may be based on pupil location within images and/or glint reflection patterns, so that the gaze angle calculation module 46 can calculate the actual gaze vector 90 and compare it to the expected gaze vector 64 to infer whether display assembly deformation has occurred.

Figure 3A:
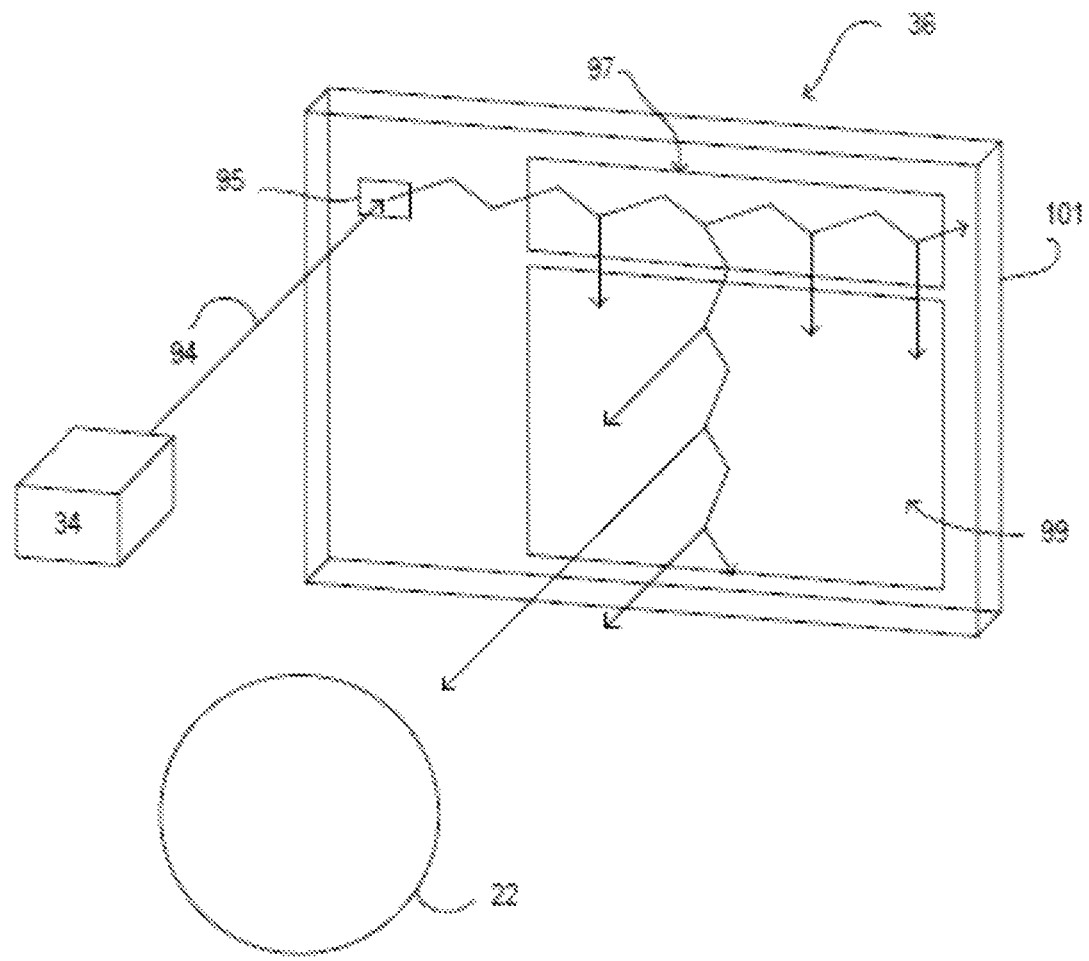
FIG. 3A is a perspective view illustrating how a location of a rendered object is established.

FIG. 3A illustrates how the location of the rendered object 62 is corrected. The projector 34 projects image light 94 associated with a virtual image or object at a predetermined angle toward the optical display 36. The image light 94 may encounter one or more diffractive optical elements, such as an incoupling grating 95, an orthogonal pupil expander 97, and an exit pupil expander 99, disposed in or on a waveguide 101 as part of the optical display 36. As the image light 94 propagates through the waveguide 101, the diffractive optical elements redirect the light in different ways, ultimately resulting in the image light 94 exiting the waveguide through the exit pupil expander 99 toward the user's eyes 22. The user's eye 22 can focus image light 94 at a location on the retina for the user to perceive the rendered object 62.

Figures 3B, 3C:
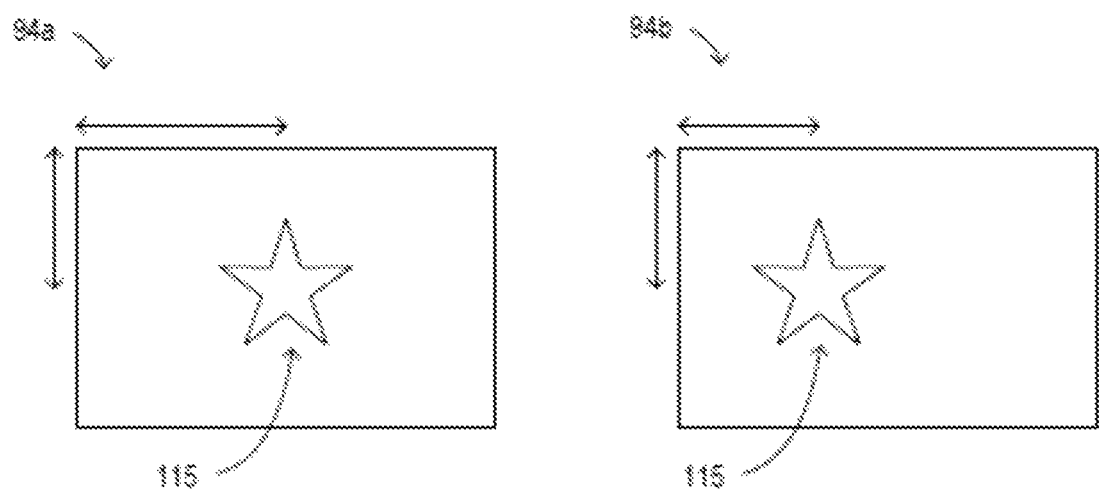
FIGS. 3B and 3C are front views that illustrate how a rendered object is moved.

Referring to FIGS. 3B and 3C, two examples of images projected as image light 94 are shown. In FIG. 3B, virtual content object 115 is shown in the center of the image 94a. When image 94a is projected toward an undeformed optical display 36 and travels through the components thereof, the user will see virtual content object 115 centered in the field of view. However, if image 94a is projected toward a deformed display, the virtual content object 115 may be perceived by the user to have shifted to the right, for example, such that it is no longer centered in the field of view. To correct for the shift caused by deformation and detected by comparing expected and actual gaze vectors, the image 94b may be projected instead of image 94a. In image 94b, the virtual content object 115 is shifted toward the left of the image such that when the light exits the deformed display at a rightward shift, the display's right shift cancels out the content's left shift and the virtual content object 115 appears to the user to be centered in the field of view. The pixel shifting may be accomplished by lighting up different pixels of a spatial light modulator (SLM) within the projector 34 using LED or other similar light sources. In such an adjustment method, it may be useful to convert the actual and expected gaze angles or gaze vectors into a display coordinate system. For example, the system may expect for a user's gaze to center on pixels at coordinates (x1, y1) but finds that the user's gaze is actually centered on pixels at coordinates (x2, y2) in the display coordinate system. In such a method, pixel shifting can be adjusted by an amount equal and opposite to the difference between the expected viewing coordinates and the actual viewing coordinates as determined by the user's gaze vector. Alternative means for adjusting the rendering location of virtual content may also be used.

Figure 3D:
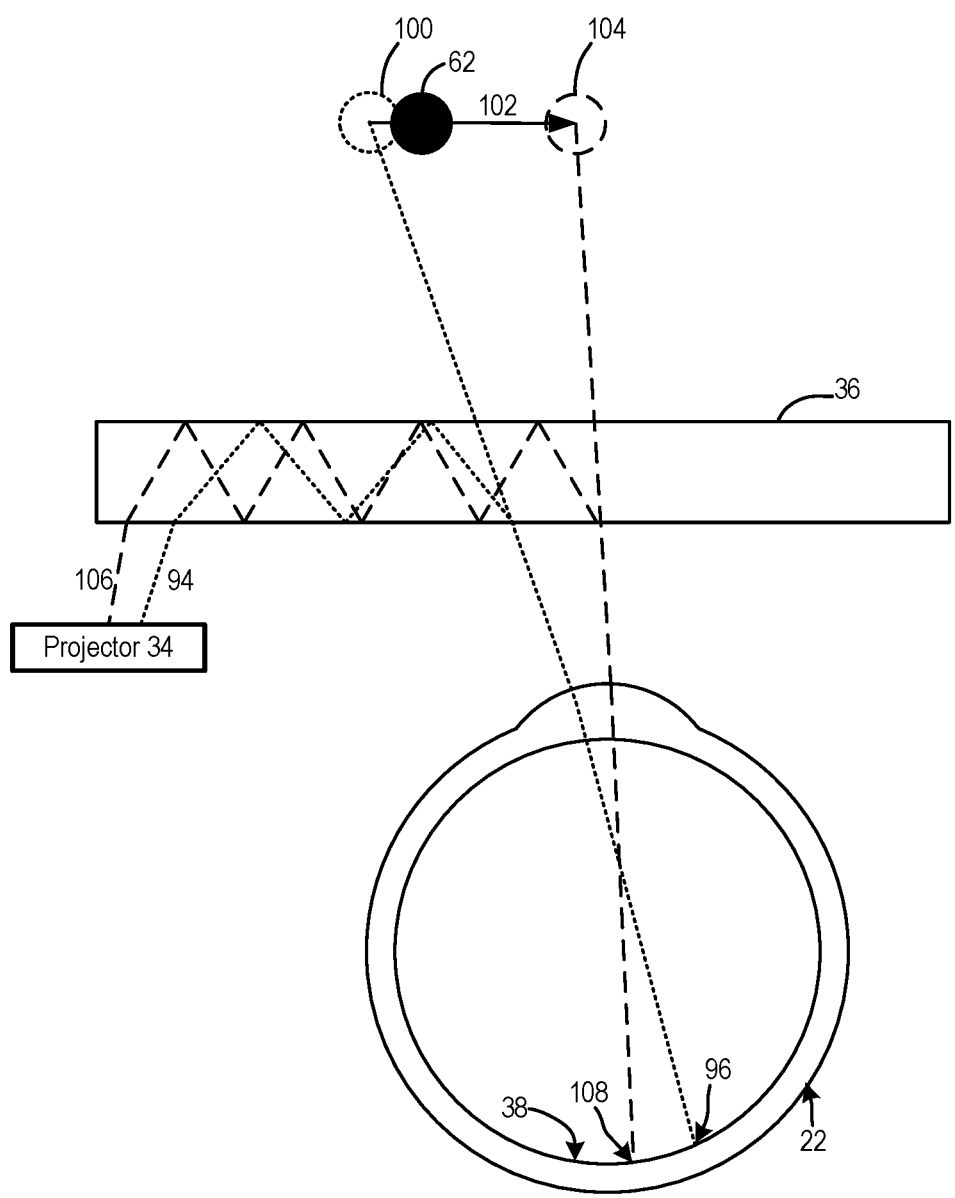
FIG. 3D is a top plan view illustrating how a location of a rendered object can be moved using different insertion angles that are provided by a laser projector.

In some embodiments, as shown in FIG. 3D, correction may be accomplished by adjusting the projector 34 itself. For a complete correction, the rendering location of the rendered object 62 has to move from the location 100 in a direction represented by a vector 102 to a corrected location 104. For a complete correction, the projector 34 may insert light 106 at an adjusted angle into the diffractive optical elements of the optical display 36 so that the rendered object 62 is viewable nearer to an intended location within the field of view. The user will perceive the rendered object 62 to have moved from the location 100 along vector 102 toward the location 104. However, a complete correction is not made. Instead, the rendered object 62 is moved by a small fraction of the distance between location 100 and location 104 along the direction represented by the vector 102. The projector 34, for purposes of making a partial correction, thus inserts light at an angle that is slightly steeper than the image light 94, but not as steep as the light 106.

Figure 4:
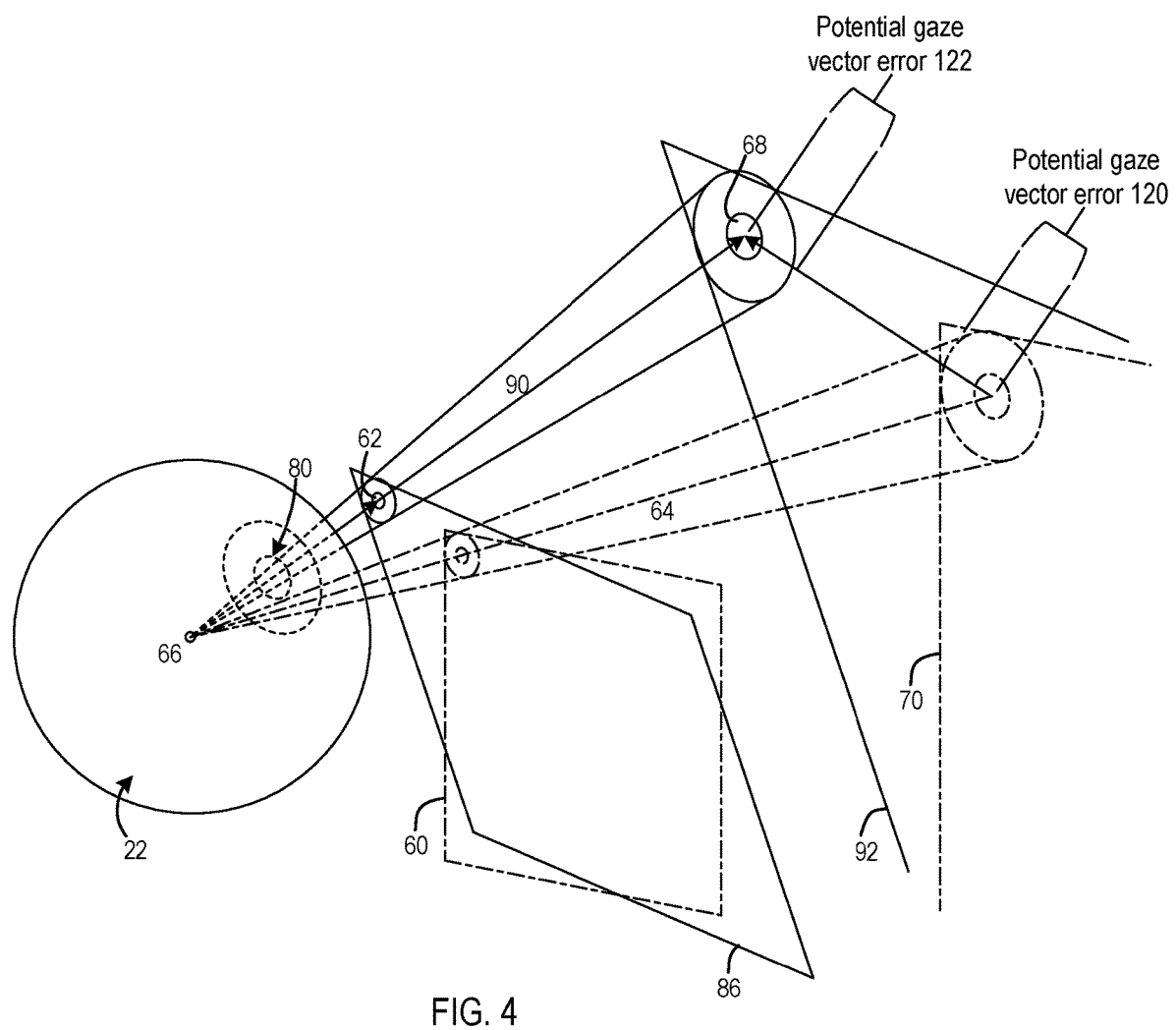
FIG. 4 is a perspective view illustrating potential gaze vector errors.

FIG. 4 illustrates potential gaze vector errors 120 and 122 at two user interaction events. Anatomically an eye is continually moving when it is focused on a static image, such as the augmented object 68. Natural eye movement typically results in about 60 arcminutes of error or deviation from a central gaze vector corresponding to the direct path from a selected anatomical marker of the eye, for example the center point 66 of the eye 22, to augmented object 68. In some embodiments, the gaze vector may be defined as a direct path from the center of a cornea of an eye to the augmented object 68, or may be defined as the extension of the visual axis of the eye. If the user looks at the augmented object 68, gaze vectors within an expected gaze vector range having a 60 arcminute radius from the gaze vector 90 may considered to be directed toward the location of augmented object 68. The gaze angle calculation module 46 in FIG. 1 may also have some error for given eye sizes, shapes, etc. and such an additional error can add, for example, around 30 arcminutes to the expected gaze vector range radius. When it is determined that the user is looking at the augmented object 68 and a gaze vector that is calculated is within a 90 arcminute radius of the gaze vector 90, the system is considered to be well calibrated.

One challenge is that the relatively large 90 arcminute radius of error in gaze vector makes it difficult to determine the exact location of the actual perceived position of the augmented object 68. In order to account for potential errors, the statistical system 48 in FIG. 1 may collect multiple data points to discover trends. The trends in the determined gaze vectors are accumulated to discover the likely location of the actual perceived position of the augmented object 68 as displayed by a system having some amount of deformation.

Because it is still uncertain how much of the position discrepancy is noise due to eye motion or algorithm errors and how much is due to actual deformation of the display assembly 24 in FIG. 1, a complete correction of the gaze vector is not carried out. By way of example, correction increments can be between 0.01 to 0.5 arcminutes, for example 0.1 arcminutes. Alternatively, the correction increment amount can be based on the amount of deformation detected, with a larger deformation necessitating larger increments. By way of example, the correction increments may be two orders of magnitude smaller than the detected deformation amount.

Figure 5A:
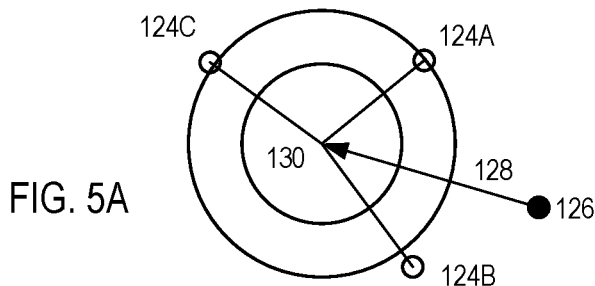
FIGS. 5A to 5D illustrate a statistical approach for determining a likely location of a virtual object and incremental movement of the virtual object to correct for its displacement.
Figure 5B:
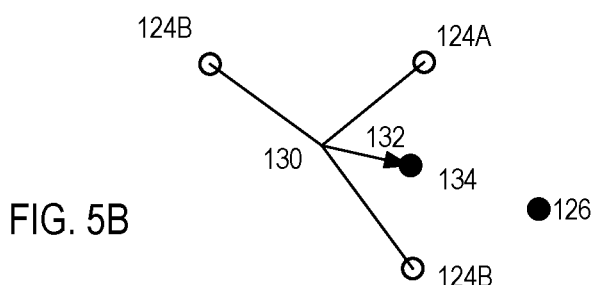

FIGS. 5A to 5D illustrate one of many scenarios that may unfold. In FIG. 5A, a number of gaze vector measurements are taken that point to locations 124A to 124C. The empty circles of locations 124A to 124C represent measured gaze angles that have been calculated. The dark circle of the location 126 indicates it is the location where the system expected the virtual object to be. The measured gaze vectors locations 124A to 124C are used by the system to calculate a statistically relevant location 130 of where the virtual object is now likely to be located. The measured gaze vectors at locations 124A to 124C indicate that a virtual object may have moved from an initial expected location 126 in a direction as represented by a vector 128 to a statistically determined altered location 130. In FIG. 5B, the virtual object rendering position is moved in a direction represented by a vector 132 which is opposite to the direction represented by a vector 128 and smaller in magnitude. The assumption is that the virtual object was located at the location 130 and has been moved to a new location 134 along a direction of the vector 132 toward the expected rendering location 126.

Figure 5C:
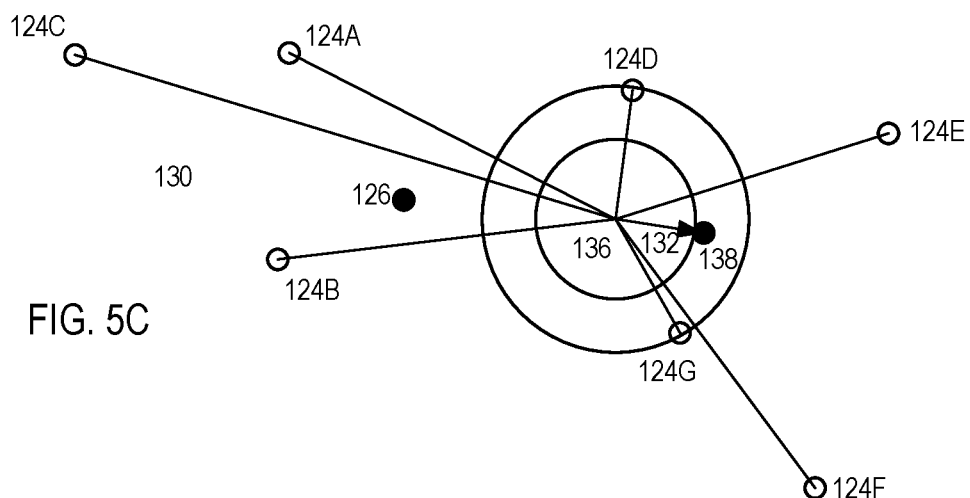

In FIG. 5C, further data points 124D to 124G are collected that statistically determine that the virtual object is located at an altered location 136. The location 136 is on an opposite side of the location 126 than the location 130. The change in object location may be a result of continued deformation of the display system. It is also possible that an error was made due to noisy data in FIG. 5A when determining that the virtual object was at the location 130 and/or that the virtual object has moved in an opposite direction. When adjusting the rendering location by the vector 132 as shown in FIG. 5B, if the virtual object was actually perceived to be in a location 136 as shown in FIG. 5C, it can be seen that it is possible that through an incorrect recalibration in FIG. 5B, the virtual object may have been moved to a new location 138. The location of the vector 132 in FIG. 5B thus represents how the system "believed" it was moving the virtual object at the time of FIG. 5B, although it can now be seen that the vector 132 is in a different location in FIG. 5C to represent how the virtual object was more likely moved at the time of FIG. 5B now that more data is available for purposes of analyzing the location of the virtual object. The vector 132 has the same magnitude and direction in FIGS. 5B and 5C. The only difference in the vector 132 between FIGS. 5B and 5C is that the location of the vector 132 is different, with the location of the vector 132 in FIG. 5B representing how the system believed it was moving the virtual object and the location of the vector 132 in FIG. 5C representing what had likely happened when the virtual object was moved in FIG. 5C. In FIG. 5C it can be seen that the movement of the virtual object from the location 136 in the direction represented by a vector 132 to the location 138, which can be traced back to FIG. 5B, was an error because the virtual object was moved further from the expected location 126 instead of nearer to it. In such an example, it is advantageous that incremental adjustments are made rather than complete adjustments.

Figure 5D:
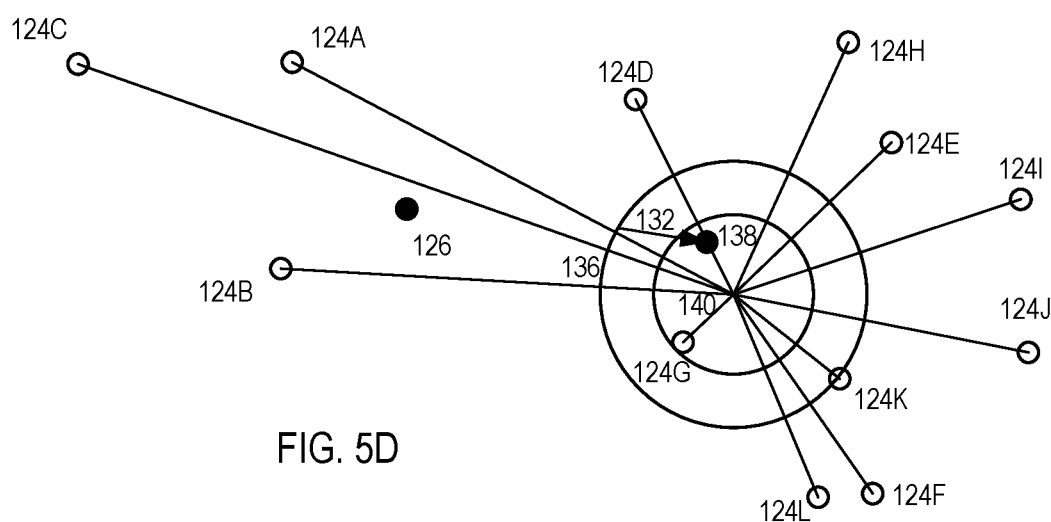

In FIG. 5D, further data points 124H to 124L are collected which indicate that the virtual object is likely at a new location 140. The vector 132 is in its same location in FIG. 5D as in FIG. 5C to represent the error that was made at the time of FIG. 5B. The location 140 has passed the location 138 and the mistake that was made by moving the virtual object in the direction represented by a vector 132 to the location 138 has thus been eviscerated.

FIGS. 5A to 5D do not illustrate every possible scenario that may unfold, but merely serve to illustrate that by moving the virtual object in small increments as opposed to a single large movement that attempts to correct for all the movement of the virtual object due to the deformation of the display assembly 24, incorrect adjustments that could be made based on noisy data are prevented from being noticeable to a user.

Figure 6A:
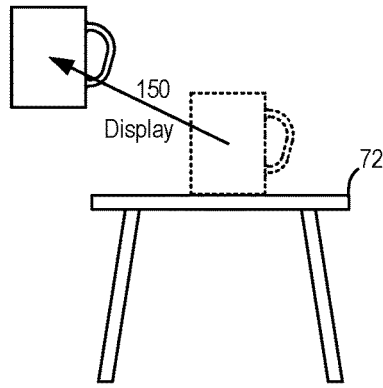
FIGS. 6A to 6C illustrate movement of a virtual object due to display deformation and correction of movement of the virtual object.

FIG. 6A illustrates a view as seen by the user, including a real world table 72 and a rendered object in the form of a coffee mug, which may for example be the augmented object 68 in the planes of the shapes 70 and 92 in FIG. 2B. The coffee mug has been moved in the view of the user as represented by the vector 150. The designation "Display" at the vector 150 indicates that undeformed shape the movement of the virtual object, as shown by the vector 150, is due to deformation of the display assembly 24 in FIG. 1.

Figure 6B:
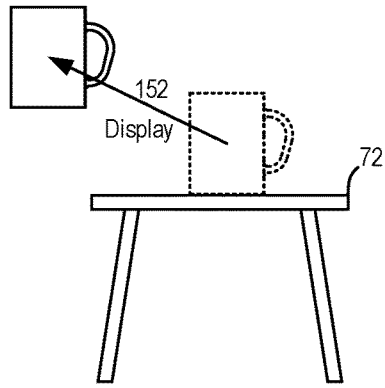

FIG. 6B illustrates the movement of the gaze angle as calculated by the gaze angle calculation module 46 in FIG. 1 based on the view of the eye tracking camera 44 in FIG. 1. The deformation of the display assembly 24 in FIG. 1 results in movement of the gaze angle as measured by the eye tracking camera 44 in the direction indicated by the vector 152. The vectors 150 and 152 in FIGS. 6A and 6B are equal to one another. The movement in the gaze angle that is calculated in FIG. 6B is thus the same as the movement of the virtual object within the vision of the user as shown in FIG. 6A, subject to the tolerances of the eye and the tracking algorithms as described with reference to FIG. 4.

Figure 6C:
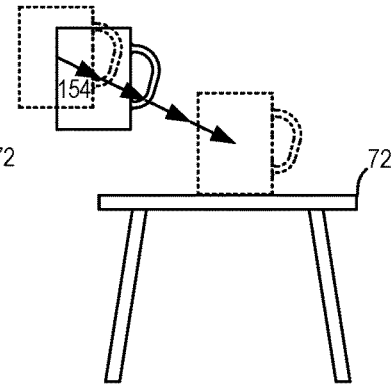

In FIG. 6C, the virtual object is incrementally moved in a direction that is shown by the vectors 154. The vectors 154 are in a direction opposite to the vector 152, but each vector is only a fraction of the length of the vector 152. The sum of the vectors 154 equals the vector 152 except in an opposite direction. If the virtual object is moved by the entire distance of all the vectors 154, the virtual object is, over time, returned to its position before the deformation of the display assembly 24 as shown in FIG. 6A, and earlier movement of the virtual object due to display deformation is accounted for.

FIGS. 6A to 6C illustrate the scenario where there is no deformation of the eye tracking camera 44 in FIG. 1. Because there is no deformation of the eye tracking camera 44, measurements taken by the eye tracking camera 44 result in measurements of gaze angles that match the actual gaze angles of the eye 22 of the user with respect to the display, subject to the tolerances discussed above.

FIGS. 7A to 7E collectively illustrate an effect that deformation of the eye tracking camera 44 in FIG. 1 can have in combination with deformation of the display. FIG. 7A illustrates the movement of the virtual object within the view of the user due to the deformation of the display assembly 24 in FIG. 1 if deformation of the camera is not taken into consideration. FIG. 7A is thus the same as FIG. 6A. It should be noted that the any deformation of the eye tracking camera 44 does not affect the positioning of the virtual object within the vision of the user as illustrated in FIG. 7A, but affects the gaze vector that is calculated with respect to the display. Therefore, even if there is also camera deformation and the effect of camera deformation is taken into consideration, FIG. 7A will still represent movement of the virtual object within the vision of the user.

FIG. 7B illustrates the movement of the gaze angle as calculated by the gaze angle calculation module 46 in FIG. 1 based on image data received from the eye tracking camera 44 if, as with FIG. 7A we do not take the effect of camera deformation into consideration. FIG. 7B, thus assumes no deformation of the eye tracking camera 44 and is therefore the same as FIG. 6B.

FIG. 7C illustrates the effect of the calculated gaze angle when we take the effect of deformation of the eye tracking camera 44 into consideration but without the effect of deformation of the display. Referring to FIG. 2A, deformation of the eye tracking camera 44 causes error in the position measurement of the eye 22 within the view of the eye tracking camera 44. Such error in the eye tracking camera 44 causes a change in the image data that the eye tracking camera 44 provides to the gaze angle calculation module 46 in FIG. 1. The gaze angle that is calculated by the gaze angle calculation module 46 is thus affected by the deformation of the eye tracking camera 44. FIG. 7C illustrates movement of the gaze angle that is calculated due to deformation of the eye tracking camera 44 and is represented by the vector 156. The error in gaze angle accuracy with respect to the display that is caused by camera deformation is usually relatively small. The movement in the gaze angle due to camera deformation is typically on the order of about 1/20 of the movement in the gaze angle due to display deformation.

FIG. 7D illustrates a resultant 158 of the vectors 152 and 156. In the present example, the vector 156 representing the effect of the camera deformation is at an angle of less than 90° of the vector 152 representing the display deformation. The vector of the resultant 158 is therefore longer than the vector 152 representing the effect of the display deformation.

In FIG. 7E, the virtual object is moved within the vision of the user as represented by the vectors 160. Each vector 160 is in a direction that is opposite to the resultant 58 in FIG. 7D. The virtual object is moved in increments each time the user interacts with an eligible virtual object. Over a period of days or weeks, the correction vectors 160 add up to the resultant 158 within the anatomical eye tolerance plus any tolerance required by tracking algorithms. As noted before, the effect of the camera deformation is relatively small. The virtual object is thus moved from a location that is closer to its location shown in FIG. 7A than in its location shown in FIG. 7E. In the case of the virtual coffee mug which is intended to appear to the user to be sitting on the table 72, the coffee mug will thus return to the top of a table or very close to the top of the table.

FIGS. 8A and 8B are similar to FIGS. 7A and 7B. In FIG. 8C, the effect of camera deformation results in a movement of the gaze angle as represented by the vector 164. An angle between the vector 164 and the vector 152 is more than 90°.

FIG. 8D illustrates a resultant vector 166. The resultant vector 166 represents the calculated change in the gaze angle due to the display deformation and the camera deformation. The resultant vector 166 is smaller than the vector 152 representing the effect of the display deformation. The effect of the display deformation and the camera deformation can be said to be in "opposite" directions in FIG. 8D and in the "same" directions in FIG. 7D.

FIG. 9 illustrates one possible solution when the effect of the display deformation and the effect of the camera deformation are in opposite directions on the calculated gaze angle. The correction system 30 in FIG. 1 does not modify the positioning of the virtual object. The user may, for example, not care whether a "play" button is located on a table or floating at some distance above the table. In addition, the play button should function properly as an interface element for the background application.

FIGS. 10A to 10C illustrate a solution as an alternative to the solution in FIG. 9. In FIG. 10A, the gaze angle change due to deformation of the camera is calculated starting when the viewing device is still new, also referred to as the "out-of-box" condition. The change in a calculated eye position with respect to the eye tracking camera due to camera deformation is periodically determined using the eye tracking camera 44 and data analysis of the generated eye tracking images. The methodology for calculating an eye position or eye center at any particular time is similar to the methodology described with reference to FIG. 2A. Images of the eyes 22 continue to serve as a basis for calculating eye center positions of each eye with respect to the one or more eye tracking cameras. Change in the eye center positions within collected image frames can be attributed to changes in location of the eye tracking cameras with respect to the eyes. While there is some error associated with device fit and consistency of how the user dons the device, the use of multiple image frames in the data analysis improves accuracy of determining eye tracking camera deformations. For example, the eye center calculated from eye tracking images taken during a setup phase of the device is determined to be at some coordinate location (x, y, z). Over time, eye tracking camera deformation could occur such that the camera tilts slightly downward. The position of the eye in the images captured with the deformed eye tracking camera will change such that the eye center is shown to be at a higher y-axis location, for example at a coordinate location (x, y+1, z) within the eye tracking image. The change between the two coordinate locations is linked to the change in the eye tracking camera and that difference can be used to correct a rendering location of virtual content on the display. The eye tracking camera deformation is represented in FIG. 10A as vector 170 and can occur in one, two, or three dimensions.

The eye tracking camera 44 runs continuously, for example at a rate of 30 frames per second. In determining the deformation of the eye tracking camera 44, it is not necessary to wait for the user to interact with particular virtual content renderings for data collection to take place. A stream of image data may be available for comparison to baseline at any given time. The use of a set of data points from the eye tracking camera 44 to compare against the baseline data provides for a robust system. For example, the use of at least the last 10 images from the eye tracking camera 44 can improve accuracy over the use of only one or two images.

FIG. 10B illustrates that the vector 166 is the sum of the vectors 152 and 170. The vector 152 can be calculated by deducting the camera deformation vector 170 from the vector 166. Because the vector 152 represents the effect of the display deformation on the location of the virtual object, the virtual object can be moved in direction opposite to the vector 152.

In FIG. 10C, the virtual object is incrementally moved as represented by the vectors 172. A sum of the vectors 172 is equal to the vector 152, but in an opposite direction.

Figure 11:
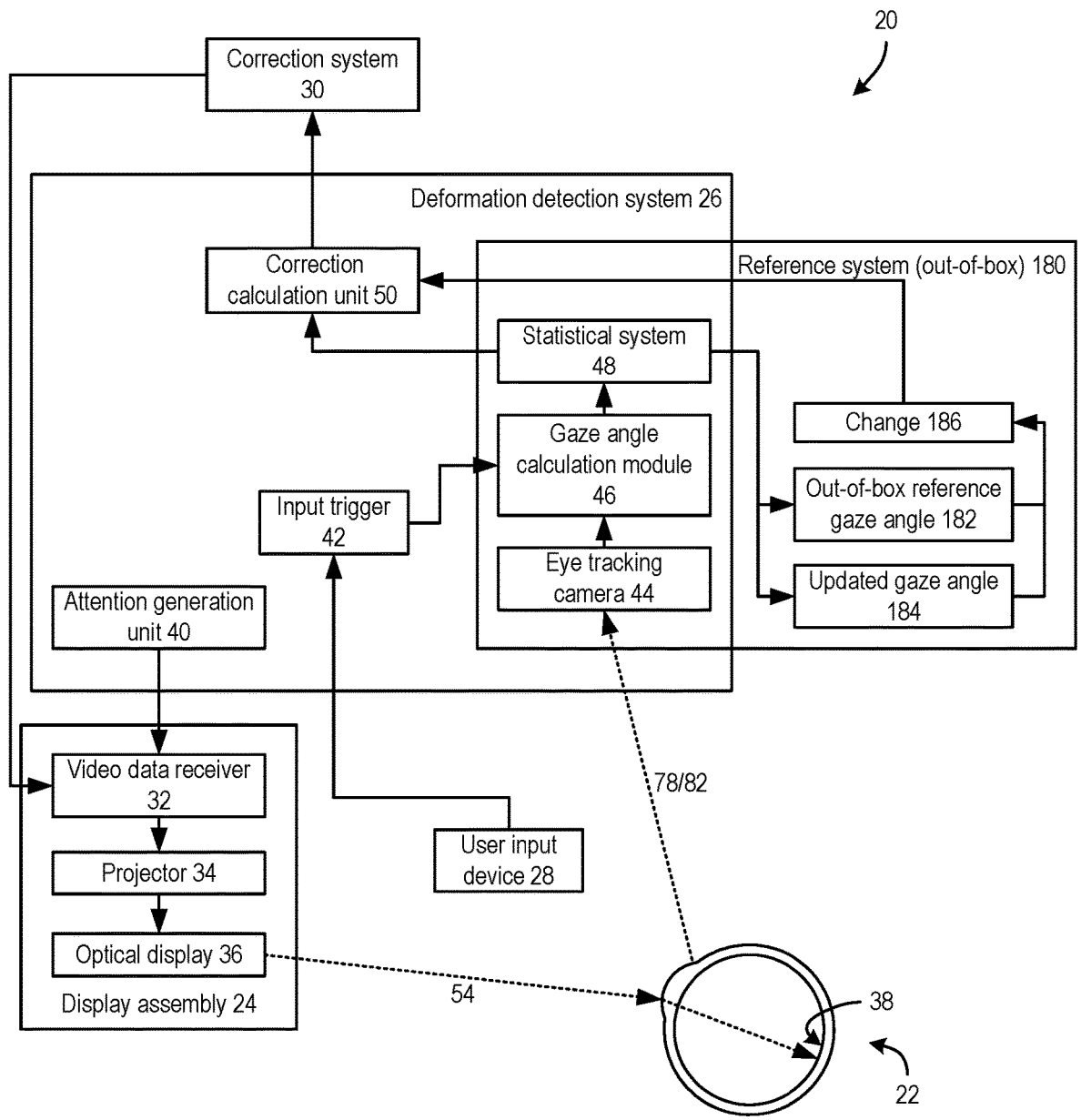
FIG. 11 is view similar to FIG. 1, further illustrating a reference system of the viewing device for purposes of integrating the process shown in FIGS. 10A to 10C.

As shown in FIG. 11, the viewing device 20 may further include a reference system 180 for purposes of the making the calculations as shown in FIGS. 10A to 10C. The reference system 180 may include many baseline calculations, images, and/or measurements such as inter-pupillary distance, eye center location, device fit information, eye shape information, visual axis location, and so on. The reference system 180 includes an out-of-box reference gaze angle 182 that is calculated when the viewing device 20 is still new. The out-of-box reference gaze angle 182 is stored in memory. The reference system 180 further has an updated gaze angle 184 stored in memory. The updated gaze angle 184 is calculated on a periodic basis and represents the gaze angle that is most recently calculated. The reference system 180 further includes a change 186 in a gaze angle due to camera deformation. The change 186 is a difference between the updated gaze angle 184 and the out-of-box reference gaze angle 182. The change 186 is represented in FIG. 10A by a sum of the vectors 170. The correction calculation unit 50 functions to calculate the vector 152 in FIG. 10B. Other aspects of the viewing device 20 in FIG. 11 are the same as the viewing device in FIG. 1 and similar reference numerals indicate similar components. While the out-of-box reference gaze angle is described as being a baseline for comparison, any other eye characteristic, measurement, calculation, or image may be used instead of, or in addition to, the out-of-box reference gaze angle.

Figure 12:
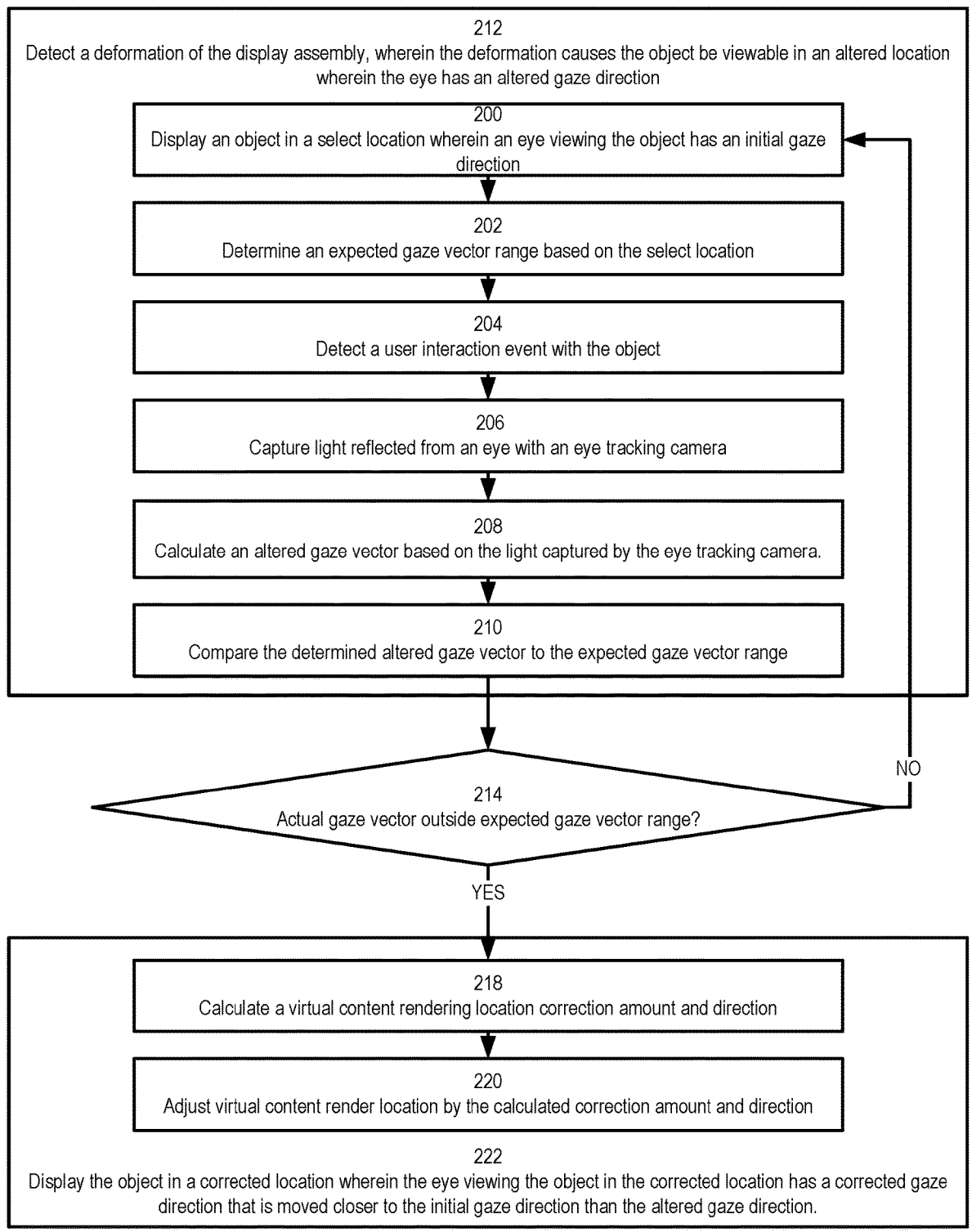
FIG. 12 is a flow chart illustrating functioning of the viewing device.

FIG. 12 illustrates the method as hereinbefore described. At 200, a virtual object is displayed at a select location wherein an eye viewing the virtual object has an expected gaze direction. At 202, an expected gaze vector range is determined based on the select location. At 204, a user interaction event is detected wherein the user interacts with the virtual object. At 206, light reflected from an eye is captured with an eye tracking camera. At 208, an altered gaze vector is calculated based on the light captured by the eye tracking camera. At 210, a comparison is made between the determined altered gaze vector and the expected gaze vector range. Elements 200 to 210 can be grouped into element 212, namely for detecting a deformation of the display assembly, wherein the deformation causes the virtual object to be viewable in an altered location wherein the eye has an altered gaze direction. It may be possible to carry out element 212 without the specific elements listed as elements 200 to 210. Furthermore, although gaze vectors are calculated, it may be possible to determine a gaze direction using a method other than one that requires a calculation of a gaze vector.

At 214, a determination is made whether the actual gaze vector is outside the gaze vector range. If the determination at 214 is negative, the process returns to 200. If the determination at 214 is positive, a virtual content rendering location correction amount and direction amount are calculated. At 220, the virtual content render location is adjusted by the calculated correction amount and direction. Elements 218 and 220 can be grouped into element 222, namely for the display of the virtual object in a corrected location wherein the eye viewing the virtual object in the corrected location has a corrected gaze direction that is moved closer to the expected gaze direction than the altered gaze direction.

Figure 13:
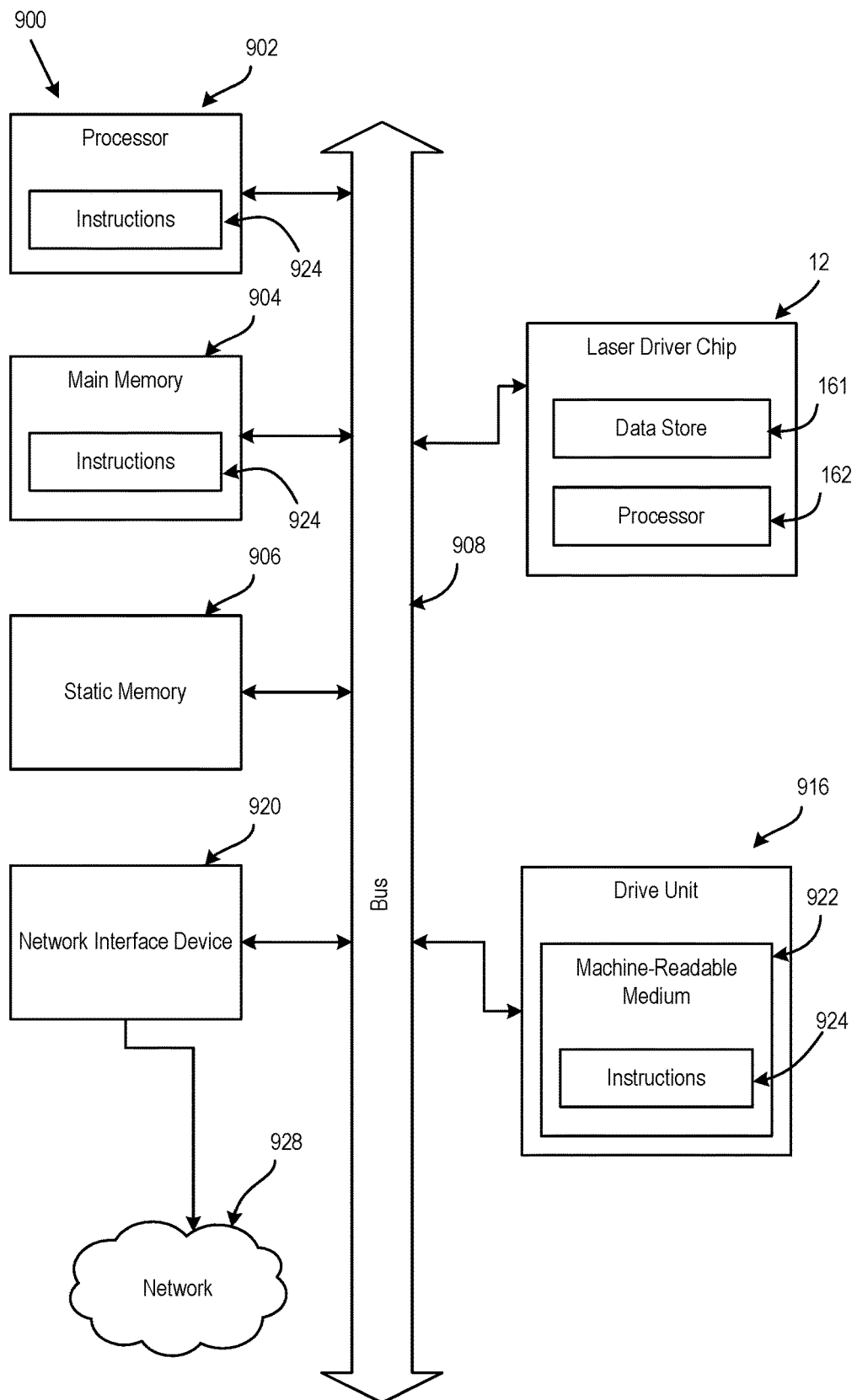
FIG. 13 is a block diagram of a machine in the form of a computer that can find application in the present invention system, in accordance with one embodiment of the invention.

FIG. 13 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908 and a laser driver chip 12 or other light source driver.

The computer system 900 may further include a disk drive unit 916, and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

While the machine-readable medium 922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The laser driver chip 12 includes a data store 161 and its own processor 162. The data store 161 is used to store instruction and data structures that are specific to the operation of a laser source. The processor 162 retrieves the instructions from the data store and has access to the data structures to execute routines that drive the laser source so that the laser source generates laser light. The laser source forms part of a projector that receives data such as video data. A scanner forms part of the projector to allow the projector to display the laser light over a two-dimensional area, and in some instances in three-dimensional space with any patterns, color, saturation and other light qualities that are created by the projector being based on values in the video data.

Although a laser source and a laser driver chip 12 have been illustrated and discussed, it may be possible to use other display systems. Other display systems may for example include displays that make use of light-emitting diode (LED) technology, organic light-emitting diode (OLED) technology, superluminescent light-emitting diode (SLED), or the like.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of displaying rendered content comprising:
displaying, with a display assembly, a virtual object in a select location on the display assembly wherein an eye viewing the virtual object has an expected gaze direction;
altering, with an attention generation unit, the display of the virtual object and attract a user's attention to the virtual object;
detecting a measured gaze direction of the eye with an eye tracking camera of the display assembly; and
detecting a deformation of the eye tracking camera of the display assembly, wherein the deformation of the eye tracking camera causes the virtual object to be viewable in an altered location wherein the eye has an altered gaze direction when detecting the measured gaze direction of the eye with the eye tracking camera.

2. The method of claim 1, further comprising:
displaying, with a display assembly, the virtual object in a corrected location wherein the eye viewing the virtual object in the corrected location has a corrected gaze direction that is moved toward the expected gaze direction from the altered gaze direction.

3. The method of claim 1, wherein the display assembly includes:
an optical display, the deformation being a deformation of the optical display.

4. The method of claim 3, wherein the optical display deforms in a display deformation direction and the altered gaze angle is moved relative to an initial gaze angle in the display deformation direction.

5. The method of claim 4, wherein the optical display is transparent and the virtual object is viewable by the eye at a location on a side of the optical display opposing the eye.

6. The method of claim 3, wherein the eye tracking camera that captures light reflected from the eye, further comprising
calculating the altered gaze based on the light captured by the eye tracking camera.

7. The method of claim 1, wherein:
a change from an initial gaze direction to the altered gaze direction is in a first direction and the change in the gaze angle direction due to the deformation of the eye tracking camera is in a first direction and the first and second directions are less than 90 degrees relative to one another, and
the eye viewing the virtual object in the corrected location has a corrected gaze direction that is moved closer to the initial gaze direction than the altered gaze direction.

8. The method of claim 7, wherein:
the change from the initial gaze direction to the altered gaze direction is in a first direction and the change in the gaze angle direction due to the deformation of the eye tracking camera is in a first direction and the first and second directions are more than 90 degrees relative to one another.

9. The method of claim 8, further comprising:
displaying the object without moving the object from the altered location.

10. The method of claim 8, further comprising:
displaying the object in a corrected location wherein the eye viewing the object in the corrected location has a corrected gaze direction that is moved closer to the initial gaze direction than the altered gaze direction.

11. The method of claim 10, further comprising:
detecting a change in the gaze angle due to the deformation of the eye tracking camera;
determining the change in the gaze angle due to the deformation of the display assembly by deducting the change in the gaze angle due to the deformation of the eye tracking camera from the change in the gaze angle; and
displaying the object in a corrected location wherein the eye viewing the object in the corrected location has a corrected gaze direction that is moved in a direction opposite to the change in the gaze angle due to the deformation of the display assembly.

12. The method of claim 1, further comprising:
taking multiple measurements;
calculating multiple gaze angles, each gaze angle for a respective one of the measurements; and
determining the altered gaze angle based on the multiple gaze angles.

13. The method of claim 1, wherein the attention generation unit attracts attention by changing a color of the virtual object.

14. The method of claim 1, wherein the attention generation unit attracts attention to the object by reducing a size of the virtual object.

* * * * *